United States Patent
Jeong et al.

(10) Patent No.: US 10,580,594 B2
(45) Date of Patent: Mar. 3, 2020

(54) ELECTRONIC DEVICE

(71) Applicant: Samsung Display Co., Ltd., Yongin-si (KR)

(72) Inventors: Hwan-hee Jeong, Cheonan-si (KR); Yong-hwan Park, Cheonan-si (KR); Yeontae Kim, Yongin-si (KR); Taejoon Kim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/381,527

(22) Filed: Apr. 11, 2019

(65) Prior Publication Data

US 2019/0237273 A1 Aug. 1, 2019

Related U.S. Application Data

(63) Continuation of application No. 15/638,090, filed on Jun. 29, 2017.

(30) Foreign Application Priority Data

Jun. 30, 2016 (KR) .................. 10-2016-0082745

(51) Int. Cl.
*G06F 3/044* (2006.01)
*G06F 3/041* (2006.01)
(Continued)

(52) U.S. Cl.
CPC ............... *H01H 1/06* (2013.01); *G06F 3/044* (2013.01); *G06F 3/047* (2013.01); *G06F 3/0412* (2013.01);
(Continued)

(58) Field of Classification Search
USPC ........................................................ 345/174
See application file for complete search history.

(56) References Cited

U.S. PATENT DOCUMENTS

| | | | |
|---|---|---|---|
| 9,465,462 B2 | 10/2016 | Jeong et al. | |
| 2008/0277259 A1* | 11/2008 | Chang .................... | G06F 3/044 200/600 |

(Continued)

FOREIGN PATENT DOCUMENTS

| | | |
|---|---|---|
| CN | 101324827 | 12/2008 |
| CN | 104345958 | 2/2015 |

(Continued)

OTHER PUBLICATIONS

Office Action dated Apr. 13, 2018, in Korean Patent Application No. 10-2016-0082745.

(Continued)

*Primary Examiner* — Chineyere D Wills-Burns
(74) *Attorney, Agent, or Firm* — H.C. Park & Associates, PLC

(57) ABSTRACT

An electronic device is provided, which includes a substrate, a protruding pattern, a first conductive pattern, an insulating layer, and a second conductive pattern. The protruding pattern is disposed on the substrate. The first conductive pattern is disposed on the substrate and covers the protruding pattern. The insulating layer is disposed on the first conductive pattern. The insulating layer includes an opening overlapping at least a portion of the protruding pattern. The second conductive pattern is disposed on the insulating layer. The second conductive pattern is connected to the first conductive pattern through the opening.

25 Claims, 33 Drawing Sheets

(51) Int. Cl.
*H01H 1/06* (2006.01)
*G06F 3/047* (2006.01)

(52) U.S. Cl.
CPC .............. *G06F 2203/04103* (2013.01); *G06F 2203/04107* (2013.01); *G06F 2203/04111* (2013.01); *H01H 2229/014* (2013.01)

(56) References Cited

U.S. PATENT DOCUMENTS

| | | | |
|---|---|---|---|
| 2008/0309635 A1* | 12/2008 | Matsuo | G06F 3/044 345/173 |
| 2009/0236151 A1* | 9/2009 | Yeh | G06F 3/0412 178/18.03 |
| 2009/0242283 A1* | 10/2009 | Chiu | G06F 3/044 178/20.01 |
| 2010/0007616 A1* | 1/2010 | Jang | G06F 3/0412 345/173 |
| 2010/0013745 A1* | 1/2010 | Kim | G06F 3/0412 345/76 |
| 2011/0279401 A1* | 11/2011 | Hong | G06F 3/044 345/174 |
| 2012/0262385 A1* | 10/2012 | Kim | G06F 3/044 345/173 |
| 2013/0278513 A1 | 10/2013 | Jang | |
| 2013/0301192 A1 | 11/2013 | Tang et al. | |
| 2013/0313582 A1 | 11/2013 | Cho et al. | |
| 2014/0159255 A1 | 6/2014 | Li et al. | |
| 2015/0027753 A1 | 1/2015 | Huang et al. | |
| 2015/0077656 A1 | 3/2015 | Ito et al. | |
| 2015/0160747 A1 | 6/2015 | Kohara et al. | |
| 2015/0177867 A1 | 6/2015 | Chung et al. | |
| 2016/0103548 A1 | 4/2016 | Jun | |
| 2016/0124545 A1* | 5/2016 | Xie | H05K 3/4685 345/174 |
| 2016/0370902 A1 | 12/2016 | Aridomi et al. | |
| 2017/0033312 A1 | 2/2017 | Kim et al. | |

FOREIGN PATENT DOCUMENTS

| | | |
|---|---|---|
| KR | 10-0841629 | 6/2008 |
| KR | 10-2013-0131155 | 12/2013 |
| KR | 10-1373044 | 3/2014 |
| KR | 10-1381204 | 4/2014 |
| KR | 10-2014-0093092 | 7/2014 |
| KR | 10-2016-0043212 | 4/2016 |
| KR | 10-2017-0015629 | 2/2017 |
| TW | 201535203 | 9/2015 |

OTHER PUBLICATIONS

Office Action dated Mar. 29, 2019, in Taiwanese Patent Application No. 106122145.
Non-Final Office Action dated Jan. 10, 2019, in U.S. Appl. No. 15/638,090.
Decision to Grant Patent dated Sep. 17, 2018, in Korean Patent Application No. 10-2016-0082745.
Final Office Action dated May 17, 2019, in U.S. Appl. No. 15/638,090.
Non-Final Office Action dated Sep. 18, 2019, in U.S. Appl. No. 15/638,090.
Examination Report dated Oct. 29, 2019, in Chinese Patent Application No. 201910027641.9.
Notice of Allowance dated Jan. 17, 2020, in U.S. Appl. No. 15/638,090.

* cited by examiner

ELECTRONIC DEVICE

CROSS-REFERENCE TO RELATED APPLICATION

This application is a Continuation of U.S. patent application Ser. No. 15/638,090, filed Jun. 29, 2017, and claims priority from and the benefit of Korean Patent Application No. 10-2016-0082745, filed Jun. 30, 2016, each of which is hereby incorporated by reference for all purposes as if fully set forth herein.

BACKGROUND

Field

Exemplary embodiments relate to an electronic device, and, more particularly, to an electronic device having improved reliability.

Discussion of the Background

An electronic device may be activated by receiving an electric signal. The electronic device may include a display device for displaying an image, a touch screen for detecting a touch applied from the outside, and/or the like. To this end, the electronic device may include various conductive patterns so as to be activated by the electric signal. Shapes or features of the conductive patterns may directly affect driving efficiency of the electronic device.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide an electronic device including a conductive pattern having improved reliability.

Additional aspects will be set forth in the detailed description which follows, and, in part, will be apparent from the disclosure, or may be learned by practice of the inventive concept.

According to one or more exemplary embodiments, an electronic device includes a substrate, a protruding pattern, a first conductive pattern, an insulating layer, and a second conductive pattern. The protruding pattern is disposed on the substrate. The first conductive pattern is disposed on the substrate and covers the protruding pattern. The insulating layer is disposed on the first conductive pattern. The insulating layer includes an opening overlapping at least a portion of the protruding pattern. The second conductive pattern is disposed on the insulating layer. The second conductive pattern is connected to the first conductive pattern through the opening.

According to exemplary embodiments, an electronic device includes a substrate, an insulating pattern, a conductive pattern, and an insulating layer. The insulating pattern is disposed on the substrate. The insulating pattern protrudes away from the substrate in at least a first direction. The conductive pattern is disposed on the substrate. The conductive pattern covers the insulating pattern. The insulating layer is disposed between the conductive pattern and the insulating pattern. The insulating layer includes an opening overlapping at least a portion of the insulating pattern. The conductive pattern comprises a recessed portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
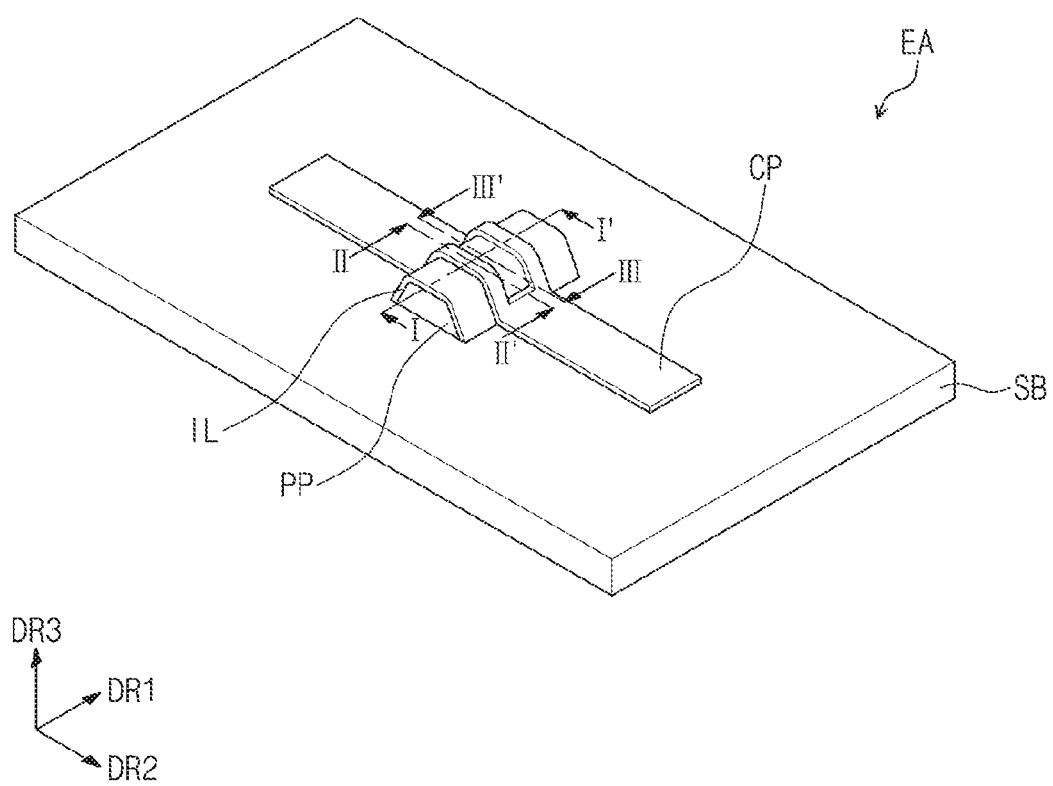
FIG. 1A is a perspective view of an electronic device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
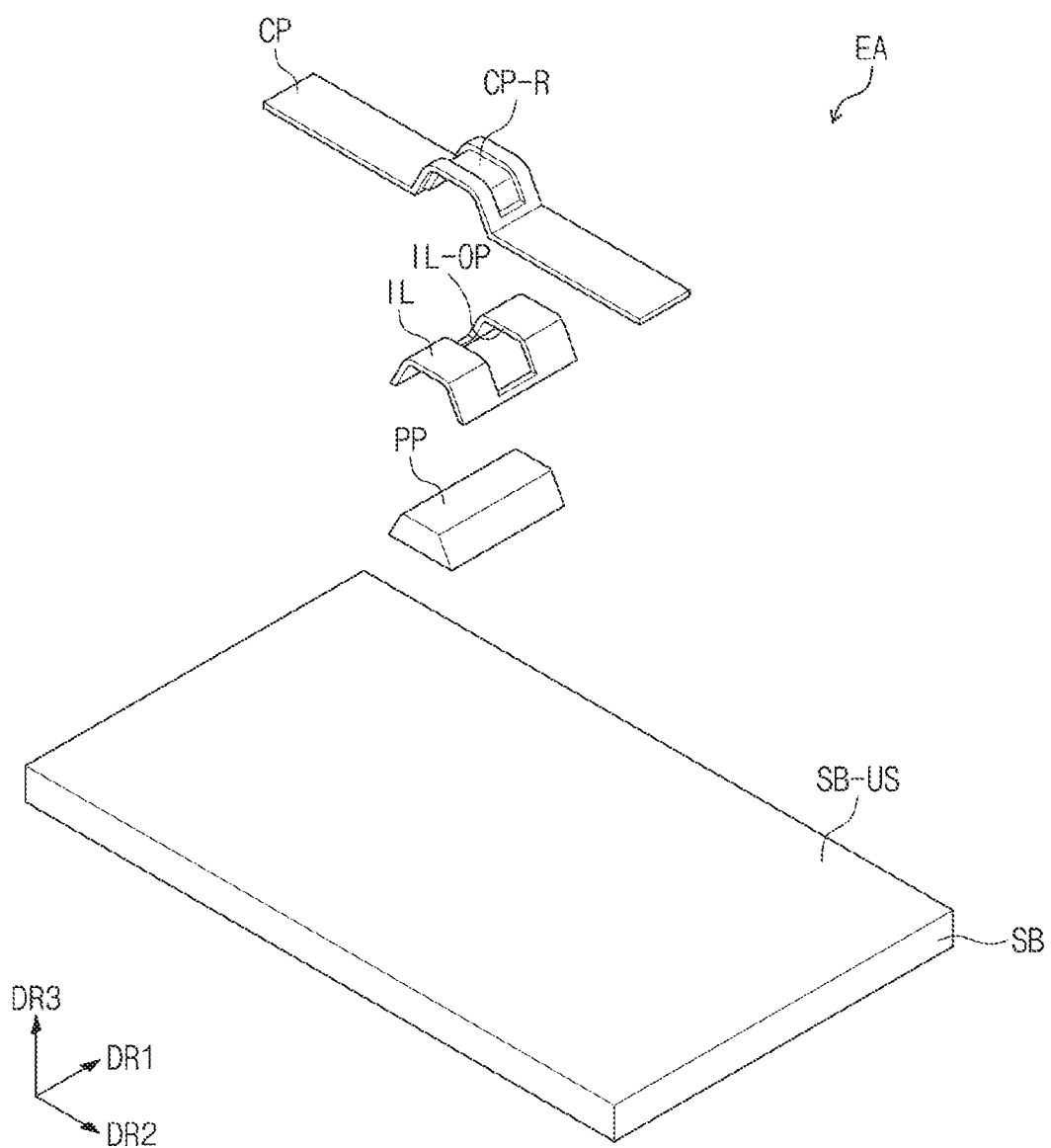
FIG. 1B is an exploded perspective view of the electronic device in FIG. 1A, according to one or more exemplary embodiments.
Figure 2:
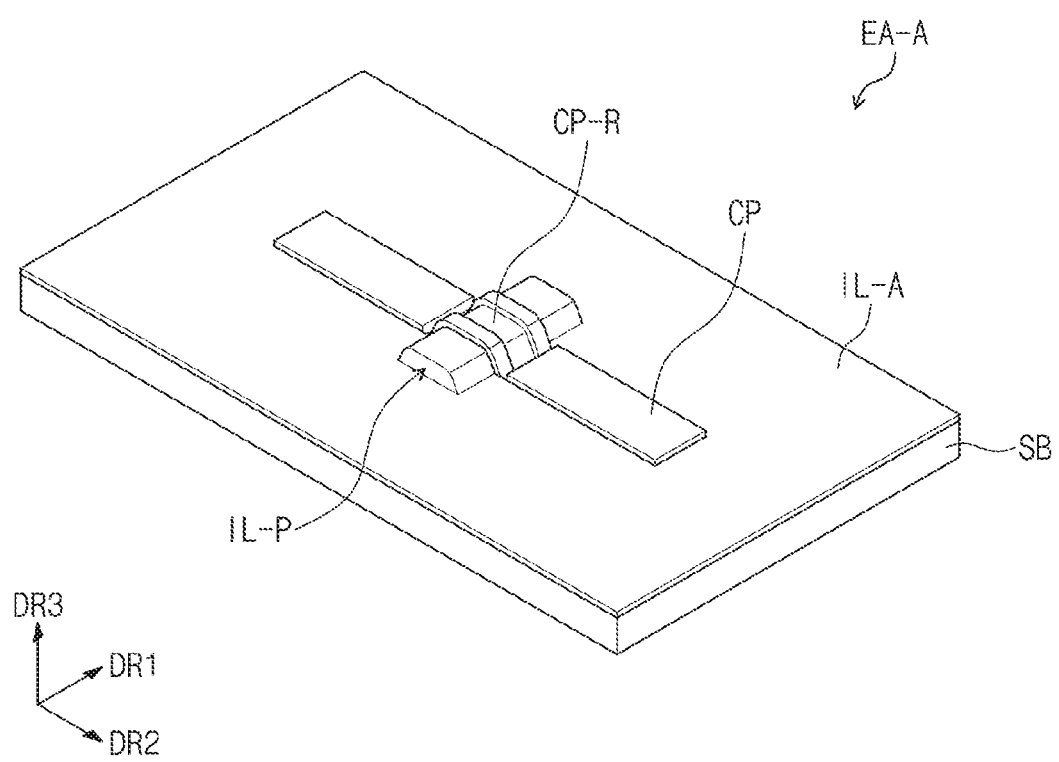
FIG. 2 is a perspective view of an electronic device, according to one or more exemplary embodiments.
Figure 3A:
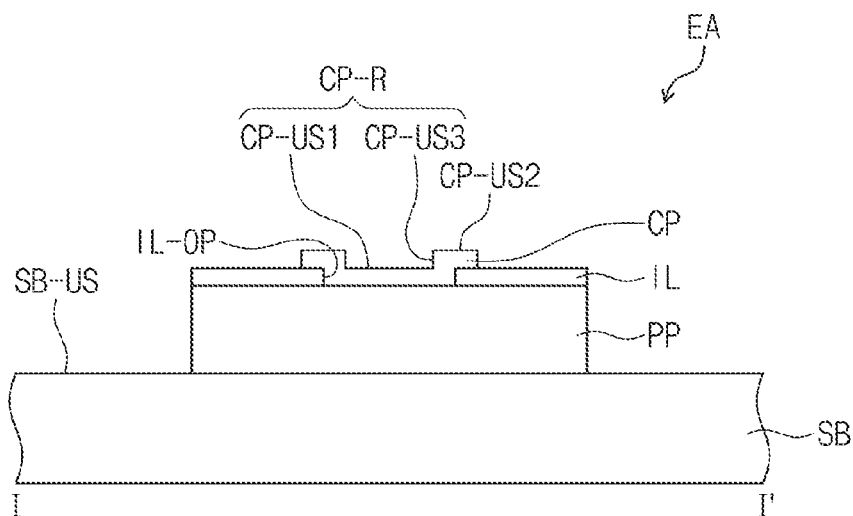
FIG. 3A is a cross-sectional view taken along sectional line I-I' of FIG. 1A, according to one or more exemplary embodiments.
Figure 3A:
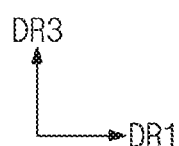
Figure 3B:
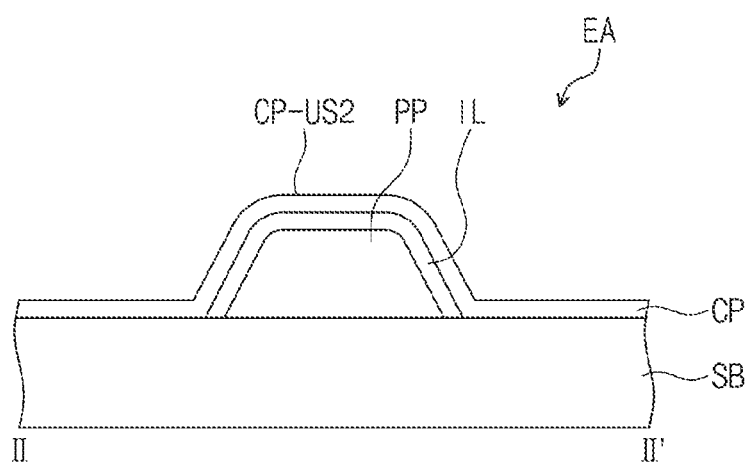
FIG. 3B is a cross-sectional view taken along sectional line II-II' of FIG. 1A, according to one or more exemplary embodiments.
Figure 3B:
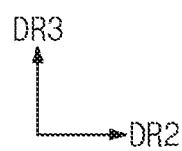
Figure 3C:
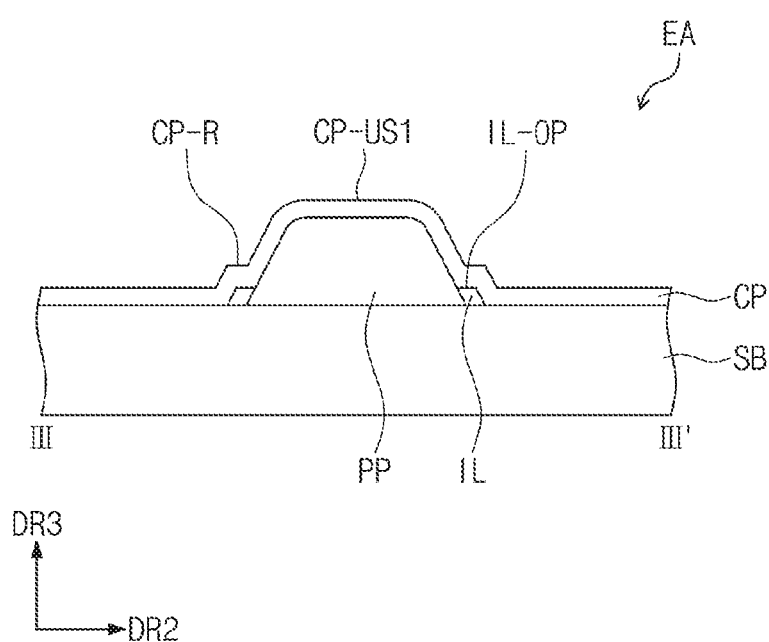
FIG. 3C is a cross-sectional view taken along sectional line III-III' of FIG. 1A, according to one or more exemplary embodiments.

FIG. 1A is a perspective view of an electronic device, according to one or more exemplary embodiments. FIG. 1B is an exploded perspective view of the electronic device in FIG. 1A, according to one or more exemplary embodiments. FIG. 2 is a perspective view of an electronic device, according to one or more exemplary embodiments. FIGS. 3A, 3B, and 3C are cross-sectional views respectively taken along sectional lines, and of FIG. 1A, according to one or more exemplary embodiments. Hereinafter, an electronic device according to one or more exemplary embodiments will be described with reference to FIGS. 1A to 3C.

An electronic device EA includes a substrate SB, a protruding pattern PP, an insulating layer IL, and a conductive pattern CP. The substrate SB may have a plate shape, e.g., a quadrangular shape including two sides extending in a first direction DR1 and two sides extending in a second direction DR2 crossing the first direction DR1. An upper surface SB-US of the substrate SB may include a flat surface in a plane defined by the first direction DR1 and the second direction DR2, which cross each other. As such, the substrate SB may provide a flat upper surface SB-US on an upper side thereof. The substrate SB may include an insulating material. For example, the substrate SB may include at least one of glass, plastic, and a plurality of thin films including an inorganic film and/or an organic film.

Although not illustrated, an additional insulating layer and/or a conductive layer may be further disposed between the substrate SB and the protruding pattern PP. It is noted, however, that the upper surface SB-US of the substrate SB may correspond to the uppermost surface on which the protruding pattern PP is disposed.

The protruding pattern PP is disposed on the substrate SB. The protruding pattern PP may contact the upper surface SB-US of the substrate SB. The protruding pattern PP may be disposed on a flat surface to protrude relatively higher than surroundings in a third direction DR3 (hereinafter, referred to as an upward direction). The protruding pattern PP may have various shapes. According to one or more exemplary embodiments, the protruding pattern PP may have a trapezoidal shape with a cross-section in a plane defined by the second direction DR2 and the third direction DR3. Exemplary embodiments, however, are not limited to or by the shape of the protruding pattern PP. For example, the protruding pattern PP may have various shapes protruding upward from the upper surface SB-US of the substrate SB.

The protruding pattern PP may include various materials. For example, the protruding pattern PP may include an organic material. The protruding pattern PP may have a height relatively greater than that of an inorganic layer to increase a degree of protrusion of the protruding pattern PP with respect to the upper surface SB-US of the substrate SB. Exemplary embodiments, however, are not limited to or by the material of the protruding pattern PP. For example, the protruding pattern PP may include an inorganic material, both an inorganic material and an organic material, etc.

The insulating layer IL is disposed on the substrate SB. At least a portion of the insulating layer IL overlaps the protruding pattern PP. According to one or more exemplary embodiments, the insulating layer IL may have various shapes. For example, as illustrated in FIG. 1B, the insulating layer IL may have a determined pattern shape covering the protruding pattern PP. Accordingly, the insulating layer IL may overlap the protruding pattern PP, and expose a portion (e.g., most) of the upper surface SB-US of the substrate SB. As another example, as illustrated in FIG. 2, an insulating layer IL-A of electronic device EA-A may be provided as a layer covering the upper surface SB-US of the substrate SB, and may include a portion IL-P defining or covering the protruding pattern PP. As such, the protruding pattern PP may not be exposed to the outside by the insulating layer IL-A and the conductive pattern CP.

With continued reference to FIGS. 1A to 3C, the insulating layer IL may be electrically insulative. In this manner, the insulating layer IL may include various insulating materials. According to one or more exemplary embodiments, the insulating layer IL may have a thickness relatively less than the thickness or height of the protruding pattern PP. Accordingly, a portion of the insulating layer IL, which is disposed on the protruding pattern PP, may form a surface curved upward along the shape of the protruding pattern PP.

An opening IL-OP of determined size and shape may be defined in the insulating layer IL. The opening IL-OP may overlap at least a portion of the protruding pattern PP, and, thereby, expose the protruding pattern PP. According to one or more exemplary embodiments, the opening IL-OP may include an area in which a portion of the insulating layer IL is removed and a cross-section exposed by the removed area. In one or more exemplary embodiments, the insulating layer IL is disposed directly on the protruding pattern PP. The opening IL-OP may expose at least a portion of the protruding pattern PP.

The conductive pattern CP is disposed on the substrate SB. The conductive pattern CP overlaps the protruding pattern PP and the opening IL-OP. The conductive pattern CP may contact at least a portion of the protruding pattern PP through the opening IL-OP. An upper surface of the conductive pattern CP may include a first surface CP-US1, a second surface CP-US2, and a third surface CP-US3. The first surface CP-US1 is disposed in the opening IL-OP. The second surface CP-US2 overlaps the insulating layer IL. The third surface CP-US3 may connect the first surface CP-US1 to the second surface CP-US2 and may be bent from each of the first surface CP-US1 and the second surface CP-US2. The first surface CP-US1 and the third surface CP-US3 may define a recessed part CP-R of a determined size and shape that is recessed from the second surface CP-US2. It is noted, however, that each of the first surface CP-US1, the second surface CP-US2, and the third surface CP-US3 may be considered as defining the recessed part CP-R of the conductive pattern CP.

According to one or more exemplary embodiments, a portion of the first surface CP-US1, which is disposed adjacent to the third surface CP-US3 and the second surface CP-US2, is recessed downward from a portion of the second surface CP-US2, which is disposed adjacent to the third surface CP-US3. Accordingly, the conductive pattern CP may include a recessed part CP-R of determined size and shape. For instance, the recessed part CP-R may have a shape corresponding to a shape of the opening IL-OP. Accordingly, as illustrated in FIGS. 3A to 3C, the recessed part CP-R may be provided in an area in which the opening IL-OP is defined.

The recessed part CP-R may, according to one or more exemplary embodiments, be defined to overlap the protruding pattern PP. Given that the conductive pattern CP, according to one or more exemplary embodiments, may further include the recessed part CP-R defined in an area overlapping the protruding pattern PP by the opening IL-OP, the conductive pattern CP may be stably provided even on the protruding pattern PP. A more detailed description of this will be described later.

Figure 4A:
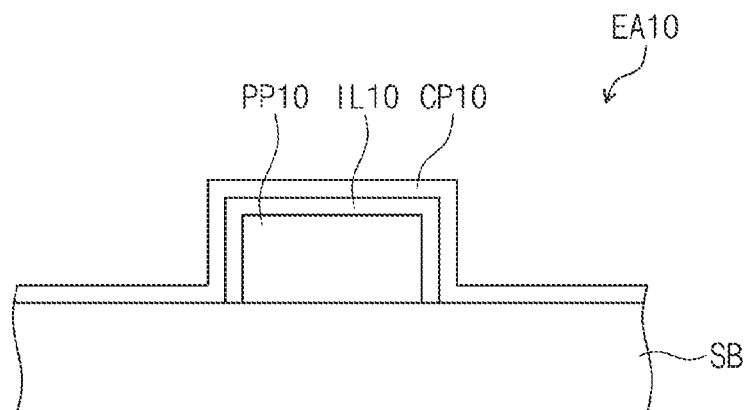
FIGS. 4A and 4B are cross-sectional views of an electronic device, according to one or more exemplary embodiments.
Figure 4B:
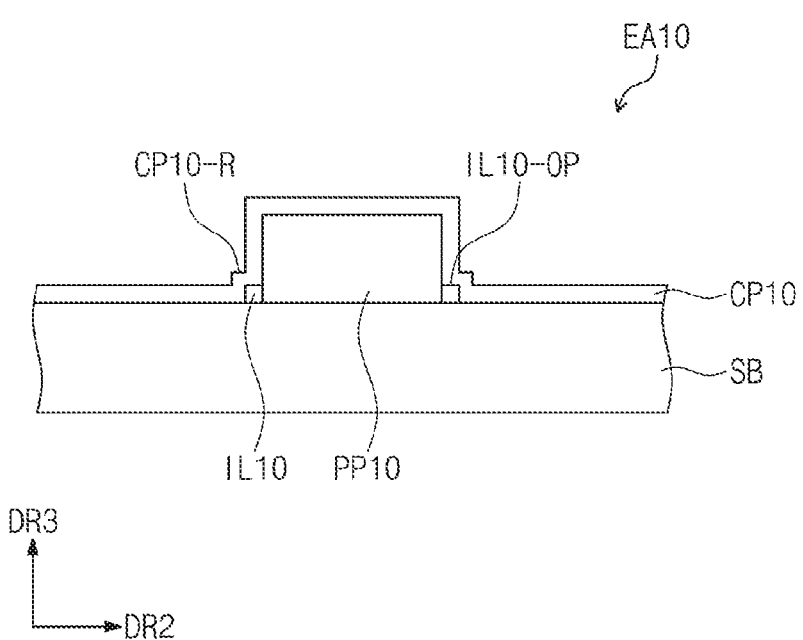
Figure 5A:
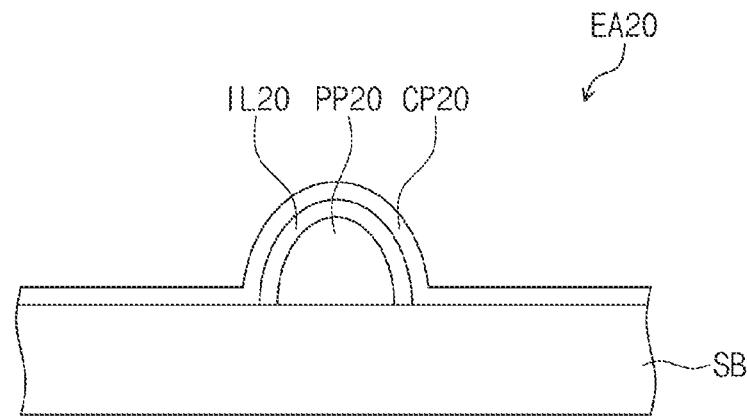
FIGS. 5A and 5B are cross-sectional views of an electronic device, according to one or more exemplary embodiments.
Figure 5A:
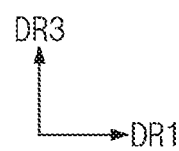
Figure 5B:
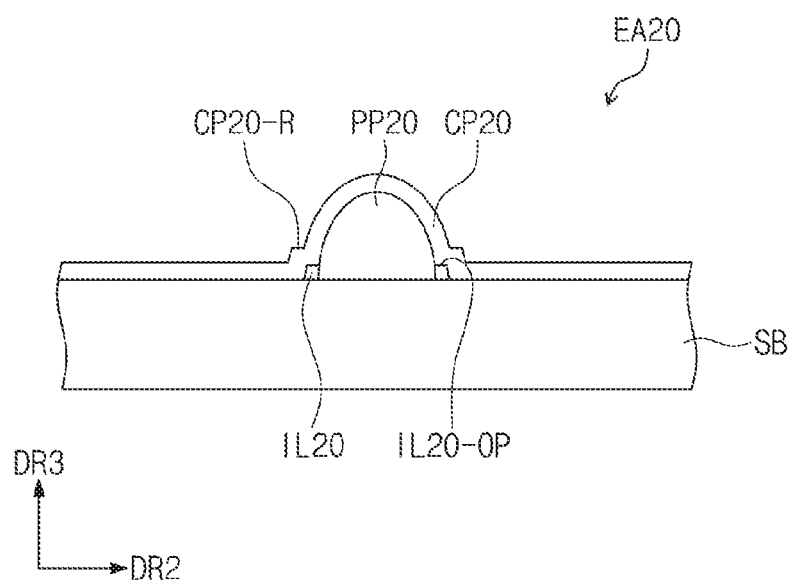

FIGS. 4A and 4B are cross-sectional views of an electronic device EA10, according to one or more exemplary embodiments. FIGS. 5A and 5B are cross-sectional views of an electronic device EA20, according to one or more exemplary embodiments. It is noted that FIGS. 4A and 4B respectively illustrate cross-sections of an electronic device EA10 respectively corresponding to areas of electronic device EA illustrated in FIGS. 3B and 3C. Further, FIGS. 5A and 5B respectively illustrate cross-sections of an electronic device EA20 respectively corresponding to areas of electronic device EA illustrated in FIGS. 3B and 3C. In this manner, each of the electronic devices EA10 and EA20 may be similar to electronic device EA, and, as such, duplicative descriptions will be omitted to avoid obscuring exemplary embodiments.

As illustrated in FIGS. 4A and 4B, a protruding pattern PP10 may have a polygonal shape in cross-section. In FIGS. 4A and 4B, protruding pattern PP10 is exemplarily illustrated with a quadrangular shape. It is contemplated, however, that any other suitable cross-sectional shape may be utilized in association with exemplary embodiments. For instance, protruding pattern PP10 may have a hexagonal shape, etc. An opening IL10-OP of a determined size and shape may be defined in an insulating layer IL10. The opening IL10-OP may expose at least a portion of protruding pattern PP10. A conductive pattern CP10 may be directly disposed on a portion of the protruding pattern PP10 exposed by the opening IL10-OP. The conductive pattern CP10 may form a recessed part CP10-R of determined size and shape, as well as be disposed on the protruding pattern PP10.

As illustrated in FIGS. 5A and 5B, a protruding pattern PP20 may have a rounded shape in cross-section. For instance, in FIGS. 5A and 5B protruding pattern PP20 is exemplarily illustrated with an oval shape. As previously mentioned, it is contemplated that any other suitable cross-sectional shape may be utilized in association with exemplary embodiments. An opening IL20-OP of a determined size and shape may be defined in an insulating layer IL20. A conductive pattern CP20 may include a recessed part CP20-R of determined size and shape, as well as be defined along the shape of the opening IL20-OP.

According to one or more exemplary embodiments, given that the conductive patterns CP10 and CP20 are partially recessed along the openings IL10-OP and IL20-OP on the protruding patterns PP10 and PP20, a degree of protrusion of each of the conductive patterns CP10 and CP20 may be relatively relieved in a protrusion area. In this manner, the conductive patterns CP10 and CP20 may respectively define recessed parts CP10-R and CP20-R and be stably provided on the protruding patterns PP10 and PP20 having various shapes.

Figure 6A:
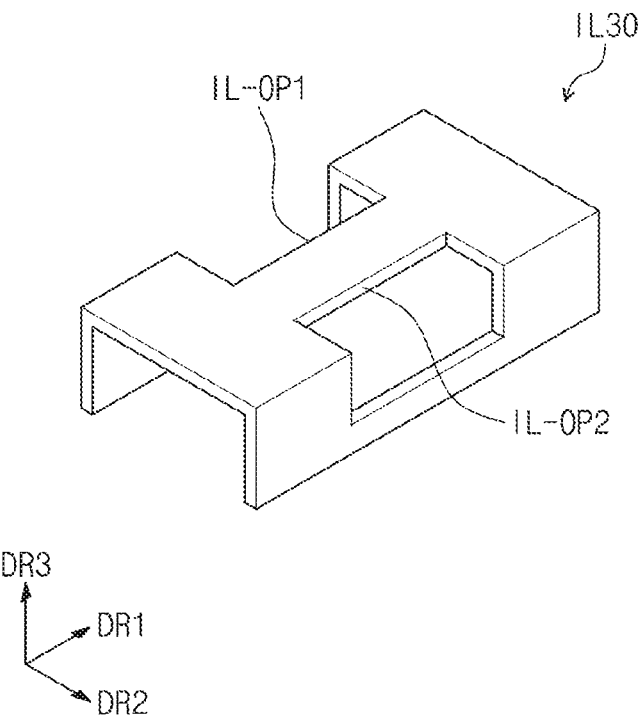
FIG. 6A is a perspective view of an insulating layer, according to one or more exemplary embodiments.
Figure 6B:
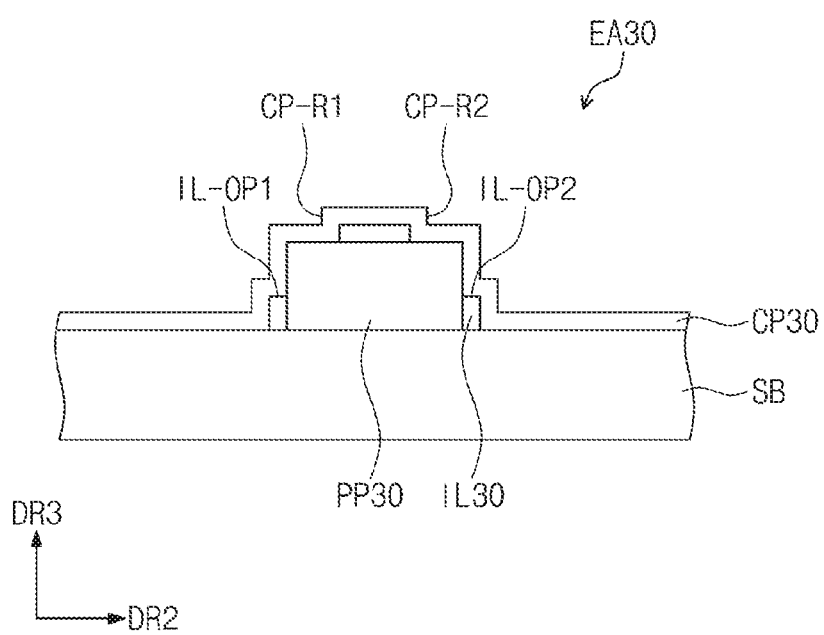
FIG. 6B is a cross-sectional view of an electronic device, according to one or more exemplary embodiments.

FIG. 6A is a perspective view of an insulating layer IL30, according to one or more exemplary embodiments. FIG. 6B is a cross-sectional view of an electronic device EA30, according to one or more exemplary embodiments. It is noted that FIG. 6B illustrates a cross-section of an electronic device EA30 including insulating layer IL30 of FIG. 6A and a cross-sectional view corresponding to the view of FIG. 3C. In this manner, electronic device EA30 may be similar to electronic device EA, and, as such, duplicative descriptions will be omitted to avoid obscuring exemplary embodiments.

As illustrated in FIG. 6A, a plurality of openings IL-OP1 and IL-OP2 may be defined in the insulating layer IL30. The insulating layer IL30 may have various shapes according to a shape of the protruding pattern PP30. According to one or more exemplary embodiments, the insulating layer IL30 covers the protruding pattern PP30 having a cross-section of a polygonal shape. The plurality of openings IL-OP1 and IL-OP2 includes a first opening IL-OP1 and a second opening IL-OP2. The first opening IL-OP1 and the second opening IL-OP2 are arranged and spaced apart from each other in a direction in which a conductive pattern CP30 extends. According to one or more exemplary embodiments, the first opening IL-OP1 and the second opening IL-OP2 may be arranged and spaced apart from each other in the second direction DR2.

The first opening IL-OP1 and the second opening IL-OP2 respectively expose portions, which are different from each other, of the protruding pattern PP30. The first opening IL-OP1 and the second opening IL-OP2 may expose angled corner portions of the protruding pattern PP30. The angled corner portions may protrude relatively outward, such as illustrated in FIG. 6B. The conductive pattern CP30 includes a first recessed part CP-R1 and a second recessed part CP-R2, which are defined along the first opening IL-OP1 and the second opening IL-OP2, respectively. The conductive pattern CP30 may be relatively recessed on the corner portions of the protruding pattern PP30 by the plurality of openings IL-OP1 and IL-OP2.

As the electronic device EA30, according to one or more exemplary embodiments, may further include the insulating layer IL30 in which the plurality of openings IL-OP1 and IL-OP2 are defined, a degree of protrusion of the conductive pattern CP30 in a relatively protruding area may be relieved. Also, as the conductive pattern CP30, according to one or more exemplary embodiments, may be selectively recessed with respect to a relatively further protruding portion of the protruding pattern PP30, the conductive pattern CP30 may have improved reliability and correspond to shapes of various protruding patterns.

Figure 7A:
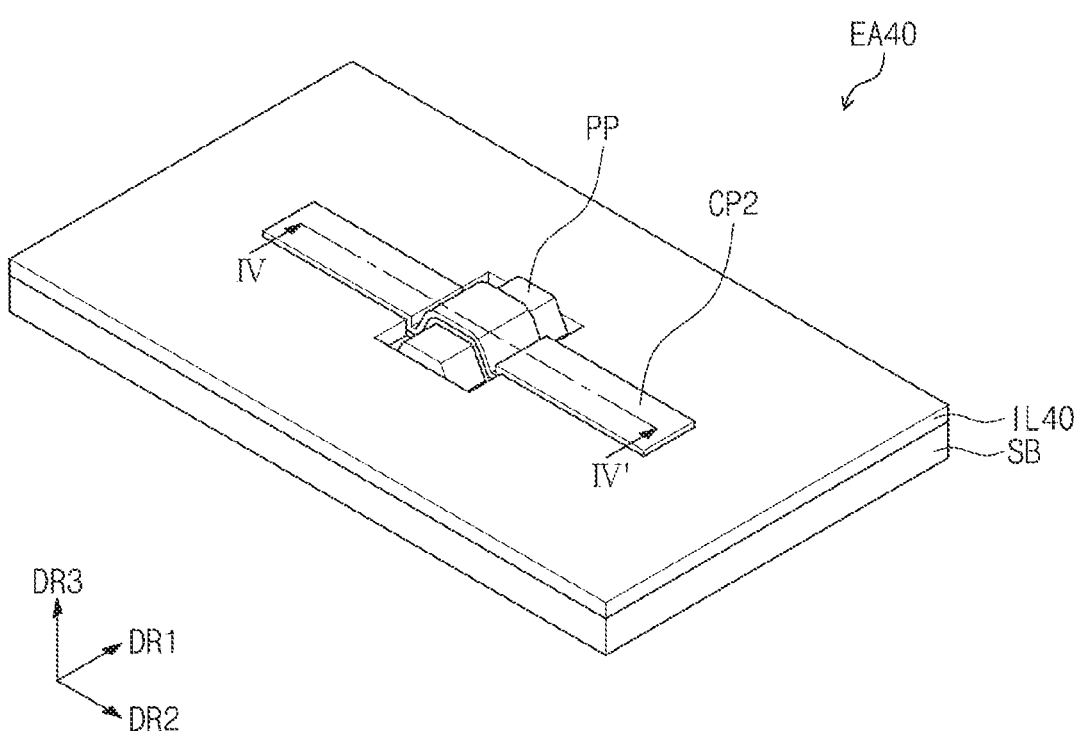
FIG. 7A is a perspective view of an electronic device, according to one or more exemplary embodiments.
Figure 7B:
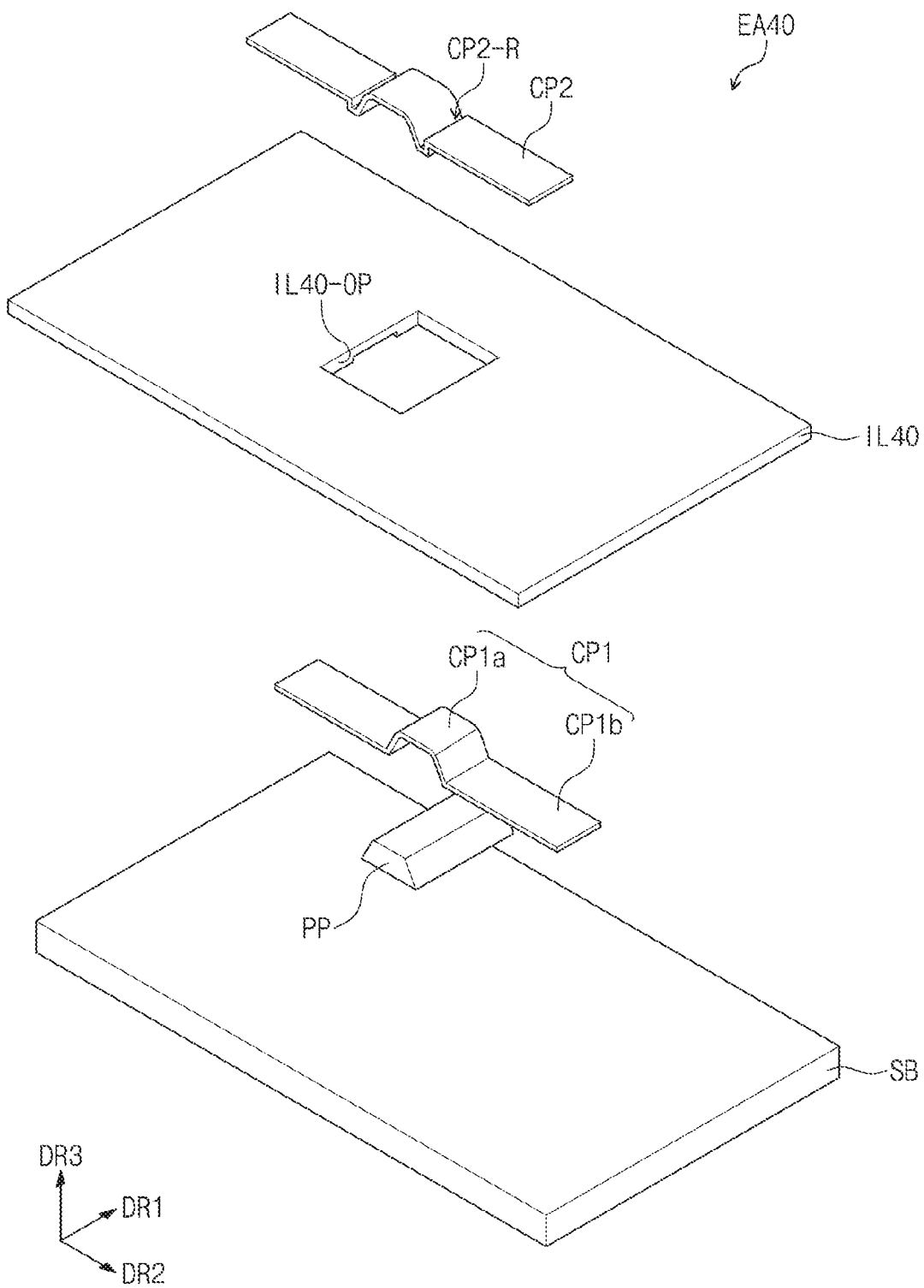
FIG. 7B is an exploded perspective view of the electronic device in FIG. 7A, according to one or more exemplary embodiments.
Figure 7C:
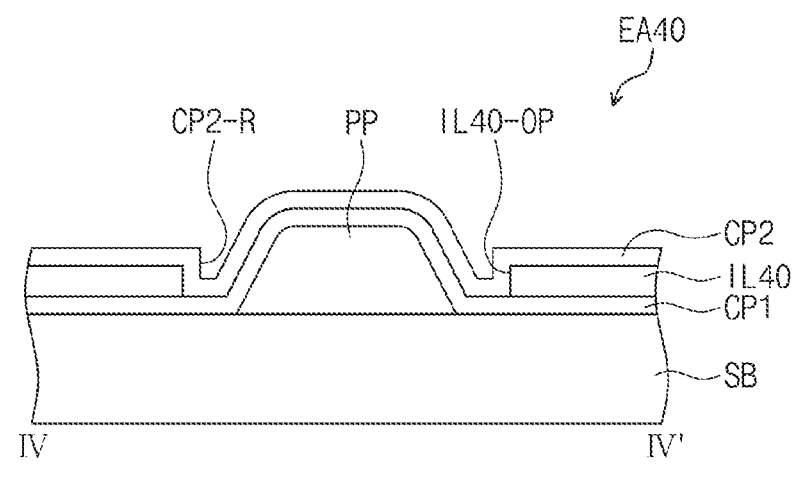
FIG. 7C is a cross-sectional view taken along sectional line IV-IV' of FIG. 7A, according to one or more exemplary embodiments.
Figure 7C:
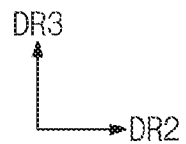

FIG. 7A is a perspective view of an electronic device EA40, according to one or more exemplary embodiments. FIG. 7B is an exploded perspective view of the electronic device EA40 in FIG. 7A, according to one or more exemplary embodiments. FIG. 7C is a cross-sectional view taken along sectional line IV-IV' of FIG. 7A, according to one or more exemplary embodiments. It is noted that electronic device EA40 may be similar to electronic device EA, and, as such, duplicative descriptions will be omitted to avoid obscuring exemplary embodiments With reference to FIGS. 7A to 7C, the electronic device EA40 includes a substrate SB, a protruding pattern PP, a first conductive pattern CP1, an insulating layer IL40, and a second conductive pattern CP2. The substrate SB and the protruding pattern PP may respectively correspond to the substrate SB and protruding pattern PP in FIG. 1.

The first conductive pattern CP1 is disposed between the protruding pattern PP and the insulating layer IL40. The first conductive pattern CP1 may extend in a direction crossing the protruding pattern PP. According to one or more exemplary embodiments, the first conductive pattern CP1 extends in the second direction DR2. The first conductive pattern CP1 overlaps the protruding pattern PP. The first conductive pattern CP1 may be divided into (or otherwise include) a first portion CP1a overlapping the protruding pattern PP and a second portion CP1b disposed on the substrate SB. Each of the first portion CP1a and the second portion CP1b may have a different upper surface according to a shape of a surface on which the first conductive pattern CP1 is provided. For example, the upper surface of the first portion CP1a may include a curved or bent surface, and the upper surface of the second portion CP1b may include a surface parallel to the substrate SB.

According to one or more exemplary embodiments, the first portion CP1a contacts the protruding pattern PP, and the second portion CP1b contacts the substrate SB, but exemplary embodiments are not limited thereto or thereby. The upper surface of the first portion CP1a may include a curved surface corresponding to an upper surface of the protruding pattern PP, and the upper surface of the second portion CP1b may include a flat surface corresponding to an upper surface of the substrate SB.

The insulating layer IL40 is disposed between the first conductive pattern CP1 and the second conductive pattern CP2. The insulating layer IL40 partially insulates the first conductive pattern CP1 and the second conductive pattern CP2. The insulating layer IL40 may be a layer covering the substrate SB. Accordingly, the insulating layer IL40 may overlap the second portion CP1b of the first conductive pattern CP1. An opening IL40-OP of a determined size and shape is defined in the insulating layer IL40. The opening IL40-OP may be defined in an area overlapping the protruding pattern PP. The insulating layer IL40 exposes at least a portion of the first conductive pattern CP1 through the opening IL40-OP. According to one or more exemplary embodiments, the opening IL40-OP may overlap an entire surface of the protruding pattern PP in a plan view. In this manner, the first portion CP1a of the first conductive pattern CP1 that overlaps the protruding pattern PP may be entirely exposed from the insulating layer IL40.

The second conductive pattern CP2 is disposed on the insulating layer IL40. The second conductive pattern CP2 may overlap at least a portion of the protruding pattern PP. The second conductive pattern CP2 may extend in a direction crossing the protruding pattern PP. In one or more exemplary embodiments, the second conductive pattern CP2 may extend parallel to the first conductive pattern CP1. According to one or more exemplary embodiments, the second conductive pattern CP2 may extend in the second direction DR2. The second conductive pattern CP2 may include a recessed part CP2-R of determined size and shape. The recessed part CP2-R may be defined along the opening IL40-OP. The recessed part CP2-R overlaps the protruding pattern PP. The second conductive pattern CP2 may be connected to the first conductive pattern CP1 through the opening IL40-OP. The recessed part CP2-R may be recessed further than another portion of the second conductive pattern CP2, which is disposed on the insulating layer IL40. In this manner, the recessed part CP2-R may contact the first portion CP1a of the first conductive pattern CP1.

As the electronic device EA40, according to one or more exemplary embodiments, may further include the insulating layer IL40 in which the opening IL40-OP is defined, the recessed part CP2-R may be defined in an area of the second conductive pattern CP2, which is disposed on the protruding pattern PP. Accordingly, the second conductive pattern CP2 may relatively relieve a degree of protrusion of the protruding pattern PP and be stably provided even on the protruding pattern PP.

Figure 8:
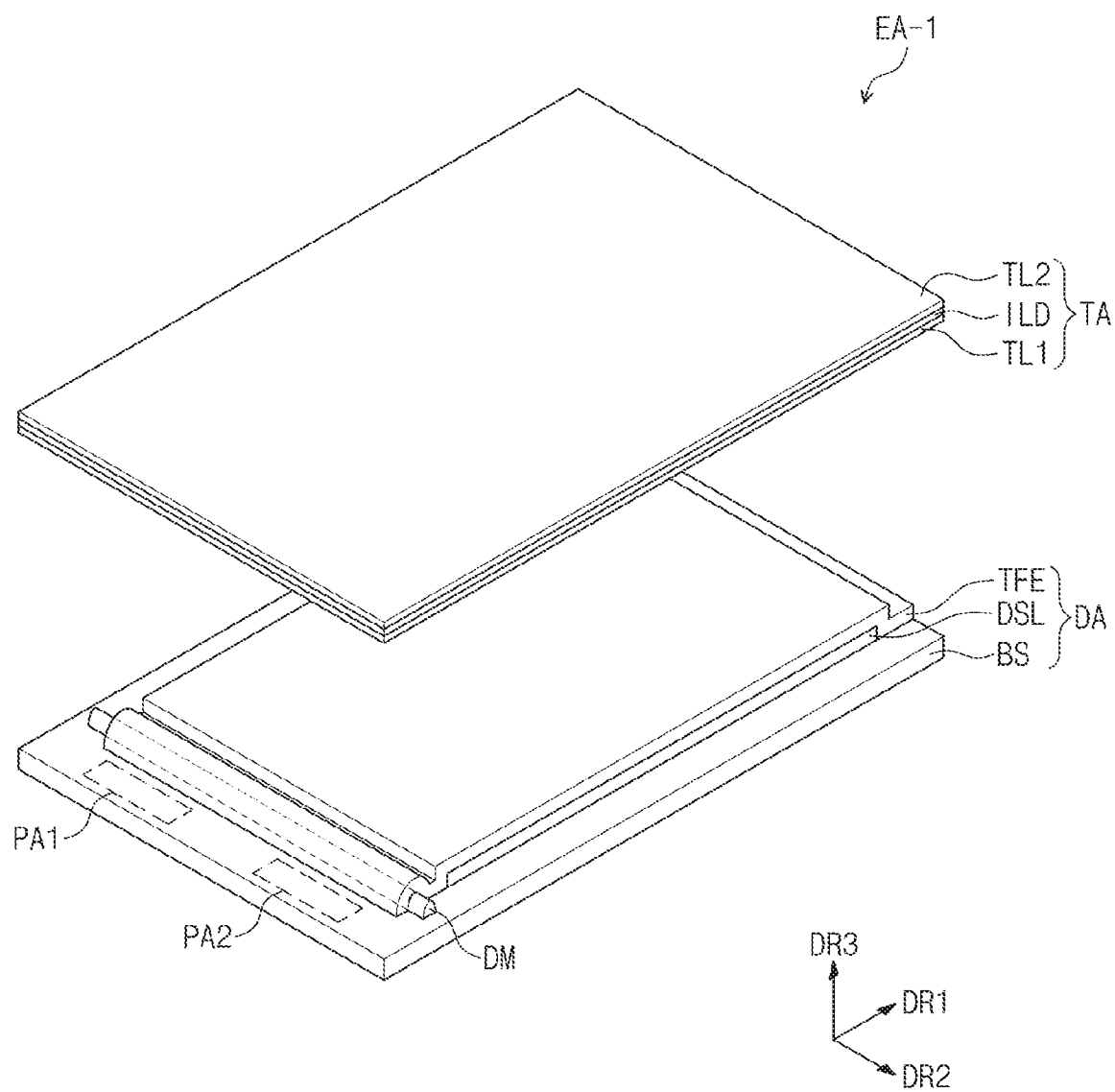
FIG. 8 is an exploded perspective view of an electronic device, according to one or more exemplary embodiments.

FIG. 8 is an exploded perspective view of an electronic device EA-1, according to one or more exemplary embodiments. An electronic device EA-1, according to one or more exemplary embodiments, will be described with reference to FIG. 8. It is noted that some components and/or features may be similar to those previously described in association with FIGS. 1 to 7C. As such, duplicative descriptions will be omitted to avoid obscuring exemplary embodiments.

As illustrated in FIG. 8, the electronic device EA-1 may include a display array DA, a dam member (or portion) DM, and a touch array TA. The display array DA provides an image to the outside. The display array DA may include a base substrate BS, a display layer DSL, and an encapsulation layer TFE. The touch array TA may include a first detection layer TL1, an interlayer insulating layer ILD, and a second detection layer TL2.

The base substrate BS may have a plate shape having a plane defined by the first direction DR1 and the second direction DR2, which cross each other, and a thickness in the third direction DR3. The base substrate BS may include an insulating material. For example, the base substrate BS may include plastic, glass, a plurality of organic films and/or inorganic films, and the like. The display layer DSL is disposed on the base substrate BS. Although not shown, the display layer DSL may include a plurality of signal lines and a plurality of pixels to which an electric signal is applied through the signal lines. The display layer DSL displays an image through the pixels driven according to the electric signal.

According to one or more exemplary embodiments, one end of each of the signal lines may be connected to each of the plurality of pixels, and the other end of each of the signal lines may extend to a first pad area PA1 defined in (or on) the base substrate BS. Determined pads may be disposed on the first pad area PA1 and respectively connected to the other ends of the signal lines. The display array DA may be driven by receiving an electric signal provided from a source (e.g., a source outside the electronic device EA-1) through the pads disposed on the first pad area PA1. To this end, each of the pixels may include at least one thin film transistor and a display element. The display element may include various elements capable of controlling a light transmission amount or producing light according to the electric signal. For example, the display element may include a liquid crystal capacitor, an electrophoretic element, an organic emission element, an electrowetting element, etc.

The encapsulation layer TFE may be disposed on the display layer DSL to cover the display layer DSL. The encapsulation layer TFE may include a plurality of organic films and/or inorganic films. The encapsulation layer TFE may protect the display layer DSL from external pollution or moisture.

The touch array TA detects a touch signal applied from the outside. The first detection layer TL1, the interlayer insulating layer ILD, and the second detection layer TL2 may be sequentially laminated in the third direction DR3. The touch array TA is disposed on the display array DA. According to one or more exemplary embodiments, the first detection layer TL1 may be directly disposed on the encapsulation layer TFE. In this manner, the electronic device EA-1 may have a slim thickness and include the touch array TA and the display array DA. Detailed description regarding the touch array TA will be described later.

The dam member DM may be disposed between the display array DA and the touch array TA. The dam member DM is disposed adjacent to the display layer DSL. The dam member DM may have a line shape extending in a direction, e.g., the second direction DR2. The dam member DM may include an insulating material. For example, the dam member DM may include an organic material or a mixed material of an organic material and an inorganic material.

The dam member DM may be covered by the encapsulation layer TFE. At least a portion of the encapsulation layer TFE may be extended to overlap the dam member DM. For instance, the encapsulation layer TFE may comprise at least one of inorganic layers and at least one of organic layers. One of the inorganic layers may overlap the dam member DM but one of the organic layers may not be extended passing the dam member DM. The dam member DM may prevent the organic layer from overflowing into the pad areas PA1 and PA2.

According to one or more exemplary embodiments, at least one of the display array DA and the touch array TA may include the protruding pattern PP (see, e.g., FIG. 1A), and at least one of the conductive patterns CP, CP1, or CP2 (see, e.g., FIGS. 1A and 7B) and the insulating layer IL (see, e.g., FIG. 1A). For example, one of the signal lines or electrodes of the display array DA, which are provided on a non-flat surface, may correspond to the previously described conductive pattern CP (see, e.g., FIG. 1A) or the previously described second conductive pattern CP2 (see, e.g., FIG. 7A). As another example, one of the driving lines or sensing patterns of the touch array TA, which are defined on a non-flat surface, may correspond to the previously described conductive pattern CP or the previously described second conductive pattern CP2. It is noted, however, that exemplary embodiments are not limited to or by the position of the conductive pattern (e.g., conductive pattern CP). For example, the conductive pattern (e.g., conductive pattern CP) may be applied on various positions when the conductive pattern (e.g., conductive pattern CP) overlaps the protruding pattern PP and the opening IL-OP to relieve a degree of protrusion of the conductive pattern (e.g., conductive pattern CP).

Given that the conductive pattern (e.g., conductive pattern CP) may be disposed on the insulating layer IL in which the opening IL-OP may be defined, the electronic device EA-1, according to one or more exemplary embodiments, may relieve a degree of protrusion of the protruding pattern PP. In this manner, the electronic device EA-1 may include the conductive patterns (e.g., conductive patterns CP) having improved reliability. Additional detailed description regarding this will be provided later.

Figure 9A:
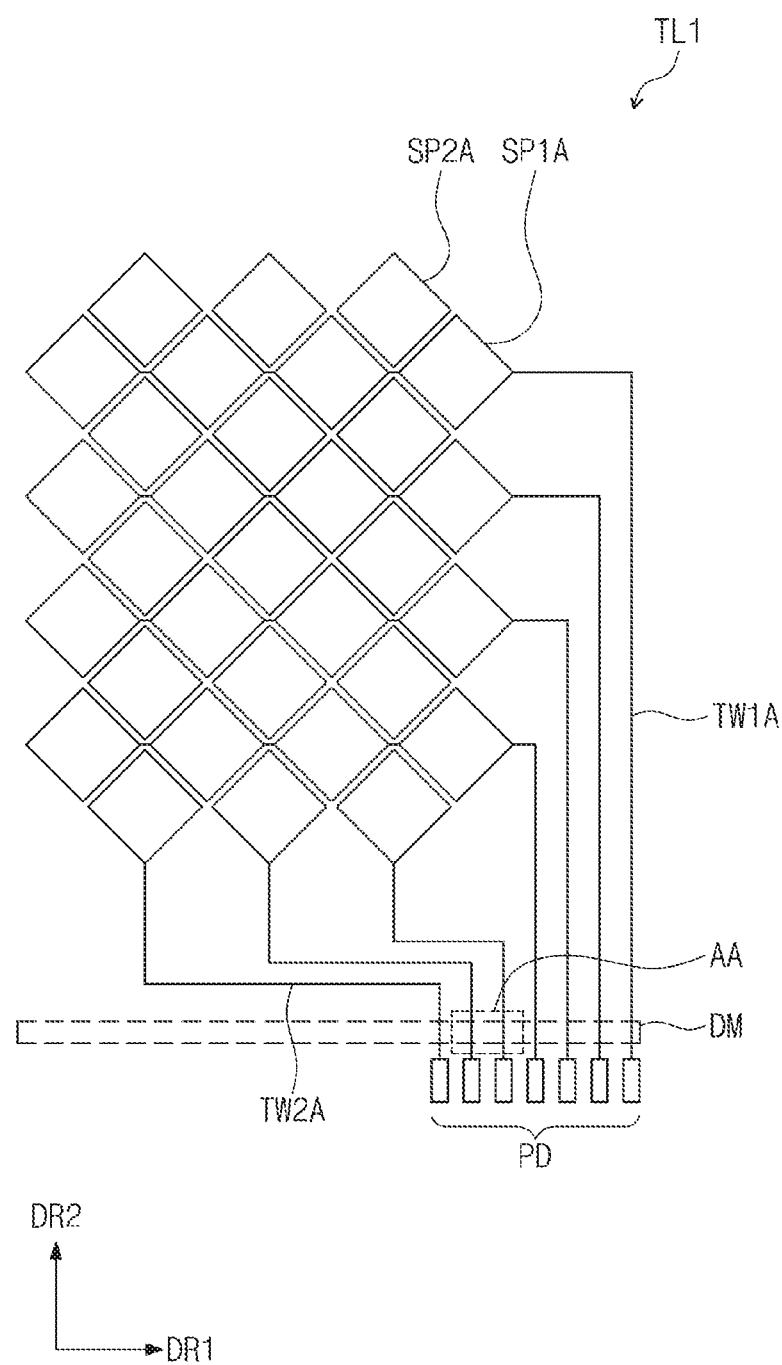
FIGS. 9A, 9B, and 9C are plan views of various layers of a touch array, according to one or more exemplary embodiments.
Figure 9B:
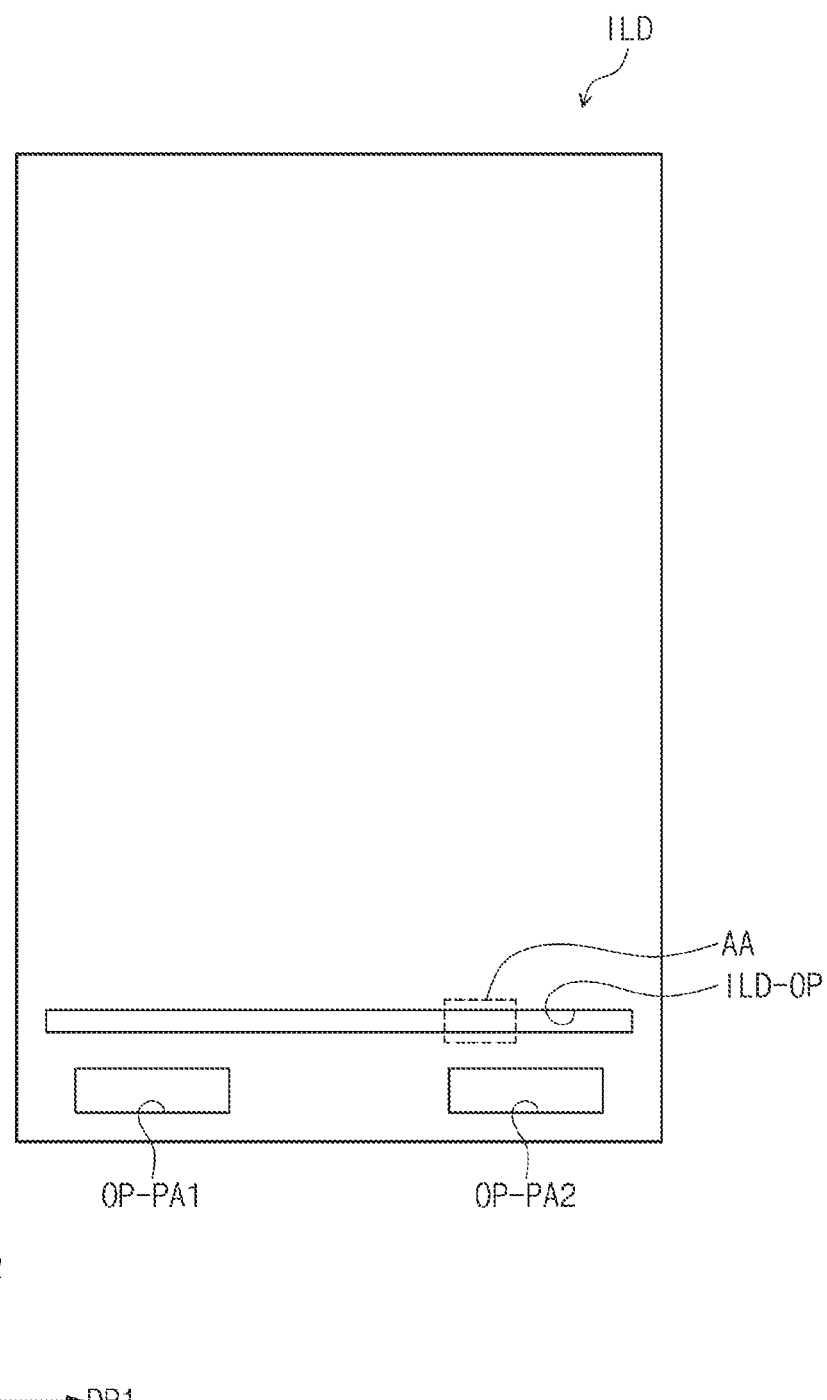
Figure 9C:
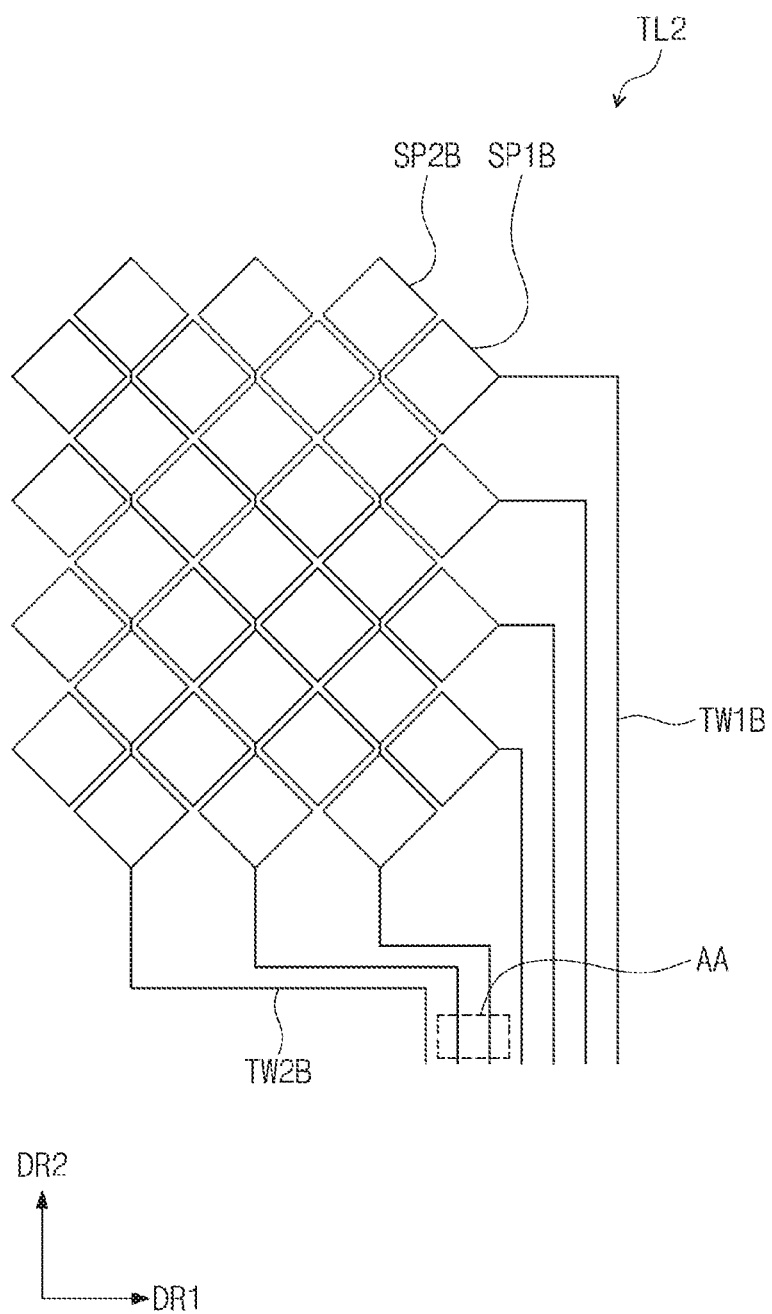

FIGS. 9A, 9B, and 9C are plan views of various layers of a touch array TA, according to one or more exemplary embodiments. That is, FIG. 9A is a plan view of a portion of the first detection layer TL1 of FIG. 8, FIG. 9B is a plan view of a portion of the interlayer insulating layer ILD of FIG. 8, and FIG. 9C is a plan view of a portion of the second detection layer TL2 of FIG. 8. It is noted that some components and/or features may be similar to those previously described in association with FIGS. 1 to 8. As such, duplicative descriptions will be omitted to avoid obscuring exemplary embodiments.

Referring to FIG. 9A, the first detection layer TL1 includes a plurality of first sensing patterns SP1A, a plurality of first assistant patterns SP2A, a plurality of first lines TW1A, a plurality of first assistant lines TW2A, and a plurality of touch pads PD. The first sensing patterns SP1A and the first assistant patterns SP2A may be disposed on a determined area (e.g., active area) for detecting an external touch, and the first lines TW1A, the first assistant lines TW2A, and the touch pads PD may be disposed on a peripheral area (e.g., non-active area) adjacent to (or outside) the determined area.

The first sensing patterns SP1A and the first assistant patterns SP2A may be arranged and spaced apart from each other. The first sensing patterns SP1A may be arranged in the first direction DR1 and connected to each other, and the connected first sensing patterns SP1A may be arranged and spaced apart from each other in the second direction DR2. The first assistant patterns SP2A and the first sensing patterns SP1A may be alternately arranged with each other. The first assistant patterns SP2A may be electrically insulated from the first sensing patterns SP1A and dummy patterns adjacent thereto in the first detection layer TL1. The first assistant patterns SP2A may be electrically floated. It is contemplated that the first assistant patterns SP2A may be connected to the second sensing patterns SP2B (refer to FIG. 9C) through contact holes (not shown) formed in the interlayer insulating layer ILD.

The first lines TW1A are connected to the first sensing patterns SP1A. The first lines TW1A connect a portion of the first sensing patterns SP1A to a portion of the touch pads PD. The first assistant lines TW2A are connected to portions of the first assistant patterns SP2A. The first assistant lines TW2A connect a portion of the first assistant patterns SP2A connected thereto to another portion of the touch pads PD. The touch pads PD are connected to the first lines TW1A and the first assistant lines TW2A, respectively. The touch array TA (refer to FIG. 8) may receive an electric signal provided from a source (e.g., an outside source) through the touch pads PD or provide a generated electric signal to the source or another component.

Although not shown, the touch pads PD may be disposed on the second pad area PA2 in FIG. 8. In this manner, the electronic device EA-1 (refer to FIG. 8), according to one or more exemplary embodiments, may provide the pads of the display array DA and the touch pads PD on the same layer. It is contemplated, however, that exemplary embodiments are not limited to or by the positions of the pads of the display array DA and the touch pads PD. For example, the pads of the display array DA and the touch pads PD may be disposed on different layers.

According to one or more exemplary embodiments, at least a portion of the first lines TW1A and the first assistant lines TW2A may overlap the dam member DM, which is illustrated as a dotted line in FIG. 9A. Referring to FIG. 8, the first lines TW1A and the first assistant lines TW2A may be disposed directly on the dam member DM.

Adverting to FIG. 9B, the interlayer insulating layer ILD is disposed on the first detection layer TL1. An opening ILD-OP of a determined size and shape is defined in the interlayer insulating layer ILD. For instance, the opening ILD-OP may be defined in an area overlapping the dam member DM. According to one or more exemplary embodiments, the opening ILD-OP may have a shape corresponding to that of the dam member DM. Exemplary embodiments, however, are not limited to or by the shape of the opening ILD-OP. For example, the opening ILD-OP may have any suitable shape that overlaps (or surrounds) at least a portion of the dam member DM.

In one or more exemplary embodiments, the interlayer insulating layer ILD may have substantially the same shape as that of the base substrate BS in FIG. 8. Accordingly, the interlayer insulating layer ILD may further include a plurality of pad openings (e.g., first pad opening OP-PA1 and second pad opening OP-PA2) exposing the first pad area PA1 and the second pad area PA2. Exemplary embodiments are not limited to the shape of the interlayer insulating layer ILD. For example, the interlayer insulating layer ILD may have a shape smaller than that of the base substrate BS, and, thereby, may not to overlap the first pad area PA1 and the second pad area PA2. In this manner, the plurality of pad openings OP-PA1 and OP-PA2 may be omitted.

As previously mentioned, a plurality of contact holes (not shown) may be defined in the interlayer insulating layer ILD. The contact holes may be arranged to respectively overlap the first assistant patterns SP2A and the first sensing patterns SP1A to electrically connect the first detection layer TL1 to the second detection layer TL2. Exemplary embodiments, however, are not limited to or by the shape of the interlayer insulating layer ILD. For example, the interlayer insulating layer ILD may have any suitable shape.

As illustrated in FIG. 9C, the second detection layer TL2 includes a plurality of second assistant patterns SP1B, a plurality of second sensing patterns SP2B, a plurality of first lines TW1B, and a plurality of second lines TW2B. The second assistant patterns SP1B and the second sensing patterns SP2B may be disposed on a determined area (e.g., active area) for detecting an external touch, and the first lines TW1B and the second lines TW2B may be disposed on a peripheral area (e.g., non-active area) adjacent to (or outside) the determined area.

The second sensing patterns SP2B and the second assistant patterns SP1B may be arranged and spaced apart from each other. The second sensing patterns SP2B may be arranged and connected to each other in the second direction DR2, and the connected second sensing patterns SP2B may be arranged and spaced apart from each other in the first direction DR1. The second assistant patterns SP1B and the second sensing patterns SP2B may be alternately arranged with each other. The second assistant patterns SP1B may be electrically insulated from the second sensing patterns SP2B and dummy patterns adjacent thereto in the second detection layer TL2. The second sensing patterns SP2B and the second assistant patterns SP1B may respectively overlap the first sensing patterns SP1A and the first assistant patterns SP2A. For example, the second sensing patterns SP2B may overlap the first assistant patterns SP2A in a plan view, and the second assistant patterns SP1B may overlap the first sensing patterns SP1A in a plan view. The second assistant patterns SP1B may be electrically floated. It is also contemplated that the second assistant patterns SP1B may be connected to the first sensing patterns SP1A via the previously described contact holes in the interlayer insulating layer ILD.

According to one or more exemplary embodiments, the second lines TW2B are connected to the second sensing patterns SP2B. The first lines TW1B are connected to a portion of the second assistant patterns SP1B. At least portions of the second lines TW2B and the first lines TW1B overlap the dam member DM (not shown). Also, at least portions of the second lines TW2B and the first lines TW1B may overlap the opening ILD-OP (not shown).

In one or more exemplary embodiments, the second lines TW2B and the first lines TW1B may be respectively connected to the first assistant lines TW2A and the first lines TW1A through the opening ILD-OP. Accordingly, although the second sensing patterns SP2B and the second lines TW2B are disposed on a layer different from the touch pads PD, the second sensing patterns SP2B and the second lines TW2B may easily transceive an electrical signal to and from the touch pads PD.

The electronic device EA-1, according to one or more exemplary embodiments, may include at least one of components respectively corresponding to the protruding pattern PP, the insulating layer IL, and the conductive pattern CP in FIG. 1A. For example, the base substrate BS may correspond to the substrate SB in FIG. 1A, the dam member DM may correspond to the protruding pattern PP in FIG. 1A, the interlayer insulating layer ILD may correspond to the insulating layer IL in FIG. 1A, and the second detection layer TL2 may correspond to the conductive pattern CP in FIG. 1A. Exemplary embodiments, however, are not limited to or by the configuration of the electronic device EA-1. For example, at least one of the display array DA and the touch array TA may include the conductive pattern CP, the protruding pattern PP, and the insulating layer IL. It is also noted that the electronic device EA-1 may include any conductive layer including a protruding part defining a non-flat surface on an upper surface thereof, an insulating layer in which an opening overlapping the protruding part is defined, and a recessed part disposed on the insulating layer and defined along the opening. Exemplary embodiments are not limited to or by the configuration of the conductive layer.

Figure 10A:
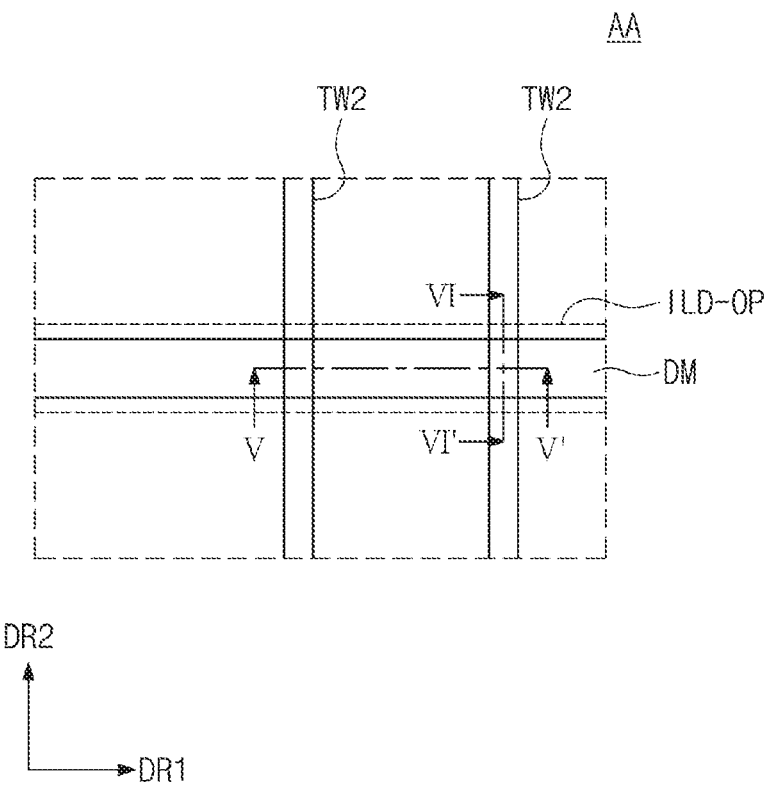
FIG. 10A is a plan view of an area AA in FIGS. 9A to 9C, according to one or more exemplary embodiments.
Figure 10B:
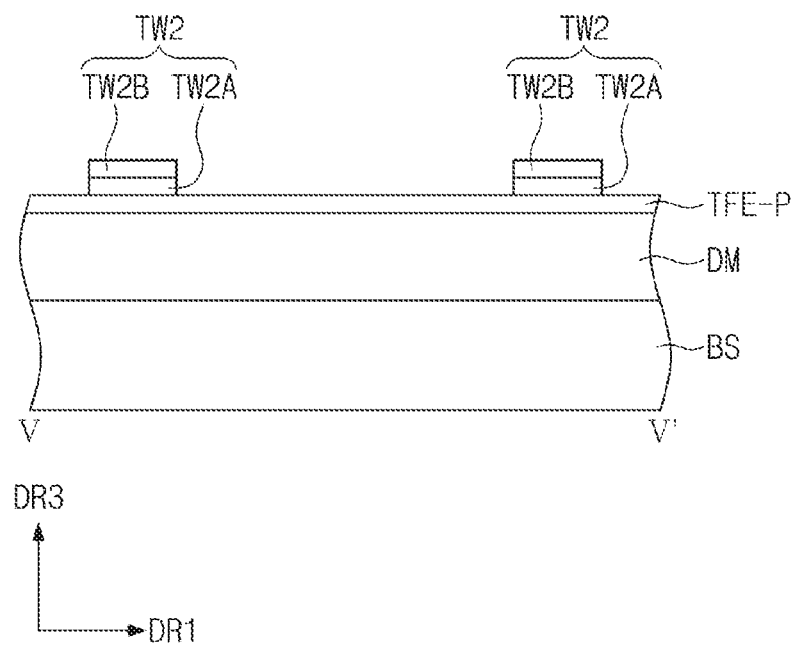
FIG. 10B is a cross-sectional view taken along sectional line V-V' of FIG. 10A, according to one or more exemplary embodiments.
Figure 10C:
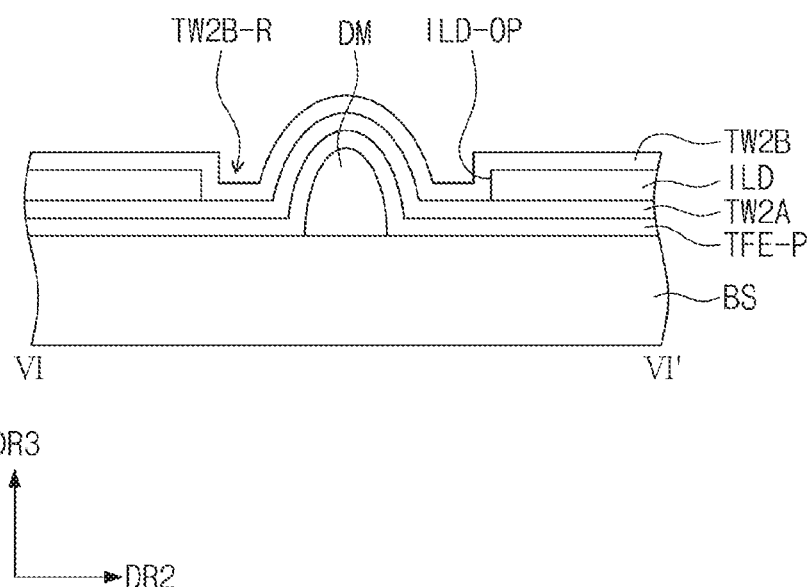
FIG. 10C is a cross-sectional view taken along sectional line VI-VI' of FIG. 10A, according to one or more exemplary embodiments.

FIG. 10A is a plan view of an area AA in FIGS. 9A to 9C, according to one or more exemplary embodiments. FIG. 10B is a cross-sectional view taken along sectional line V-V' of FIG. 10A, according to one or more exemplary embodiments. FIG. 10C is a cross-sectional view taken along sectional line VI-VI' of FIG. 10A, according to one or more exemplary embodiments. For descriptive and illustrative convenience, a portion of the encapsulation layer TFE which overlaps the dam member DM is represented as a portion layer TFE-P. It is noted that FIGS. 10A to 10C are illustrated with reference to the touch array TA in which the components of FIGS. 9A to 9C are assembled. Some of the components and/or features of FIGS. 10A to 10C may be similar to those previously described in association with FIGS. 1 to 9C. As such, duplicative descriptions will be omitted to avoid obscuring exemplary embodiments.

Referring to FIG. 10A, the dam member DM may have a line shape extending in the first direction DR1. A second driving line TW2 may extend in a direction crossing the dam member DM. According to one or more exemplary embodiments, the second driving line TW2 extends in the second direction DR2. In one or more exemplary embodiments, the opening ILD-OP of the interlayer insulating layer ILD may extend along the dam member DM. Accordingly, the opening ILD-OP may have a line shape extending in the first direction DR1 and a width extending in the second direction DR2.

As illustrated in FIG. 10B, the second driving line TW2 is disposed on the dam member DM. In a cross-sectional view defined in association with the first direction DR1 and the third direction DR3, the second driving line TW2 may be provided in plural, such that adjacent second driving lines TW2 are spaced apart from each other in the first direction DR1. The second driving line TW2 may include a first assistant line TW2A and a second line TW2B. Since the second driving line TW2 is disposed in the opening ILD-OP, the first assistant line TW2A may contact the second line TW2B.

Adverting to FIG. 10C, in a cross-sectional view defined in association with the second direction DR2 and the third direction DR3, the first assistant line TW2A and the second line TW2B extend in the second direction DR2. The opening ILD-OP is defined to overlap the dam member DM. The second line TW2B may partially overlap the interlayer insulating layer ILD and the dam member DM in the second direction DR2. A portion of the second line TW2B that overlaps the dam member DM is recessed along the opening ILD-OP to define a recessed part TW2B-R of determined size and shape.

According to one or more exemplary embodiments, the second line TW2B may be connected to the first assistant line TW2A through the recess part TW2B-R. A portion of the recess part TW2B-R that overlaps the dam member DM may include a convex upper surface protruding upward along a shape of the dam member DM. Given that the electronic device EA-1, according to one or more exemplary embodiments, further includes the interlayer insulating layer ILD in which the opening ILD-OP overlapping the dam member DM is defined, the second line TW2B may have a recessed shape in an area in which the second line TW2B overlaps the dam member DM. Accordingly, a degree of protrusion of the second line TW2B may be relieved by the opening ILD-OP. It is also noted that the first assistant line TW2A may relieve a degree of protrusion of the second line TW2B.

Figure 11A:
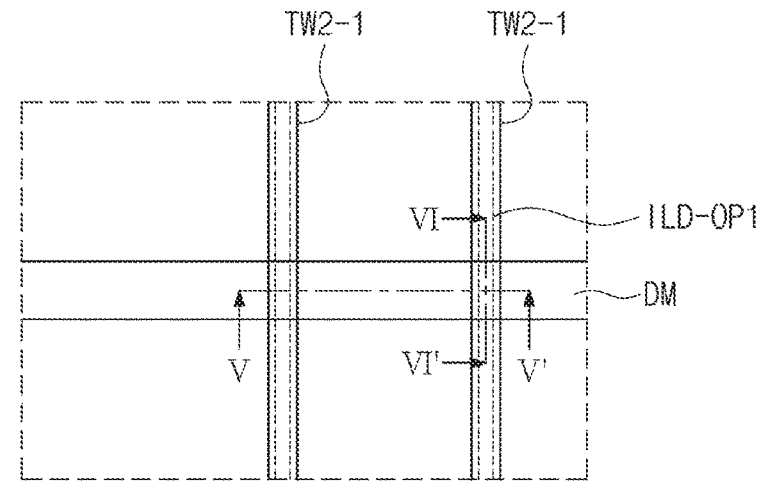
FIG. 11A is a plan view of a partial area of an electronic device, according to one or more exemplary embodiments.
Figure 11A:
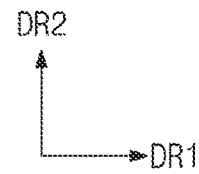
Figure 11B:
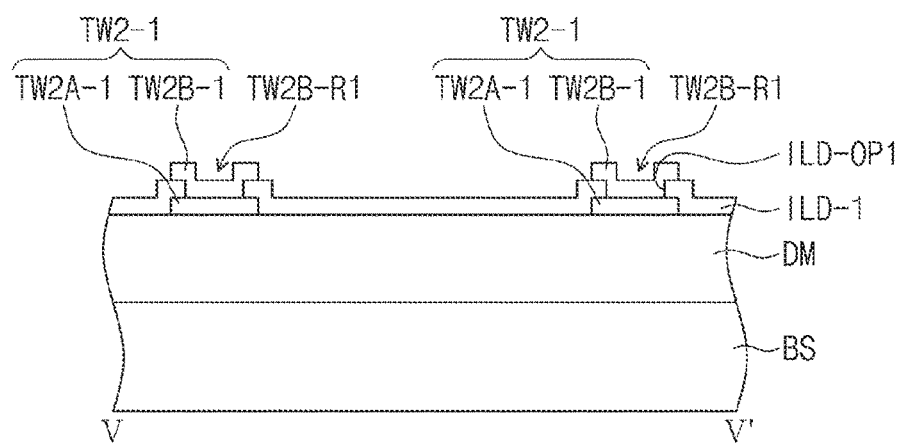
FIG. 11B is a cross-sectional view taken along sectional line V-V' of FIG. 11A, according to one or more exemplary embodiments.
Figure 11B:
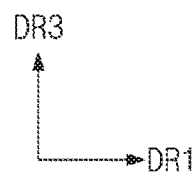
Figure 11C:
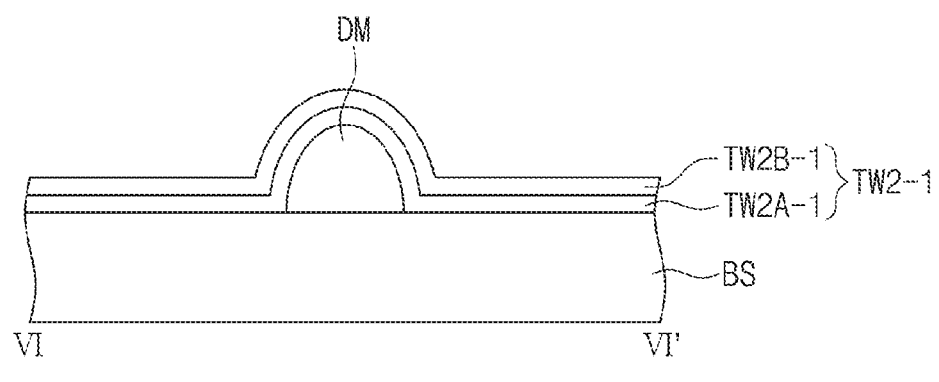
FIG. 11C is a cross-sectional view taken along sectional line VI-VI' of FIG. 11A, according to one or more exemplary embodiments.
Figure 11C:
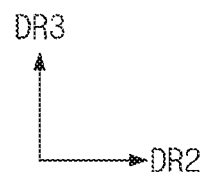

FIG. 11A is a plan view of a partial area of an electronic device, according to one or more exemplary embodiments. FIG. 11B is a cross-sectional view taken along sectional line V-V' of FIG. 11A, according to one or more exemplary embodiments. FIG. 11C is a cross-sectional view taken along sectional line VI-VI' of FIG. 11A, according to one or more exemplary embodiments. For descriptive and illustrative convenience, it is noted that FIG. 11A illustrates an area corresponding to area AA of FIG. 10A. Some of the components and/or features of FIGS. 11A to 11C may be similar to those previously described in association with FIGS. 1 to 10C. As such, duplicative descriptions will be omitted to avoid obscuring exemplary embodiments.

The electronic device in FIGS. 11A to 11C may include an interlayer insulating layer ILD-1 including an opening ILD-OP1 having a shape different from that of the opening ILD-OP (refer to FIG. 10A) of the electronic device in FIG. 10A. As illustrated in FIG. 11A, the opening ILD-OP1 of the interlayer insulating layer ILD-1 may extend along a second driving line TW2-1. Accordingly, the opening ILD-OP1 may have a line shape extending in the second direction DR2.

Referring to FIG. 11B, a plurality of second driving lines TW2-1 are disposed on the dam member DM and spaced apart from each other in the first direction DR1. The second lines TW2B-1 are connected to first assistant lines TW2A-1 through the openings ILD-OP1 respectively overlapping the second lines TW2B-1. Recessed parts TW2B-R1 of a determined size and shape are defined in each of the second lines TW2B-1. Each of the recessed parts TW2B-R1 has a shape corresponding to each of the openings ILD-OP1.

Adverting to FIG. 11C, in a cross-sectional view defined in association with the second direction DR2 and the third direction DR3, an additional interlayer insulating layer ILD-1 may not be illustrated, and the second line TW2B-1 and the first assistant line TW2A-1 may extend in the second direction DR2.

Figure 12A:
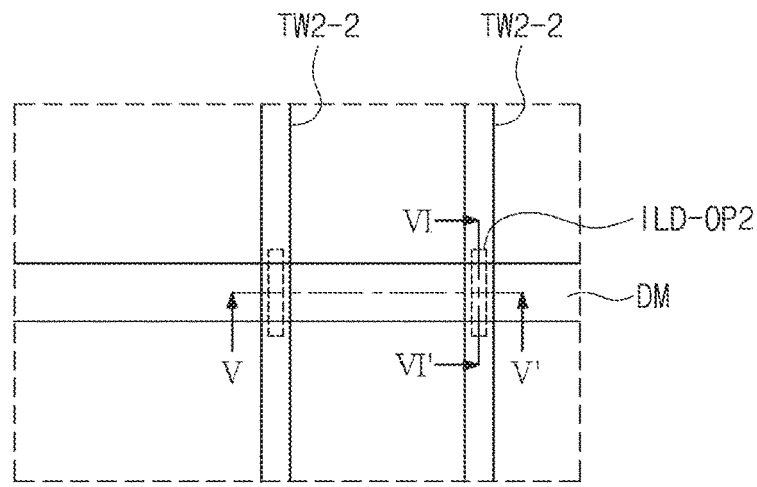
FIG. 12A is a plan view of a partial area of an electronic device, according to one or more exemplary embodiments.
Figure 12A:
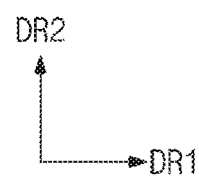
Figure 12B:
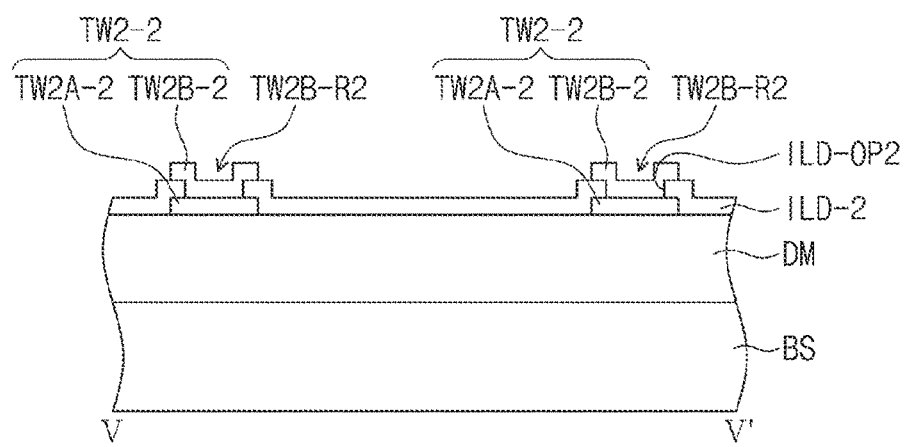
FIG. 12B is a cross-sectional view taken along sectional line V-V' of FIG. 12A, according to one or more exemplary embodiments.
Figure 12B:
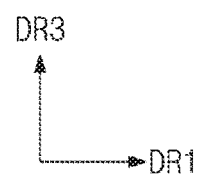
Figure 12C:
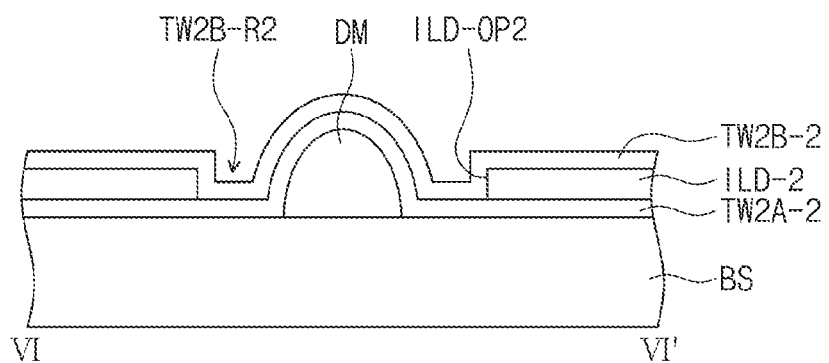
FIG. 12C is a cross-sectional view taken along sectional line VI-VI' of FIG. 12A, according to one or more exemplary embodiments.
Figure 12C:
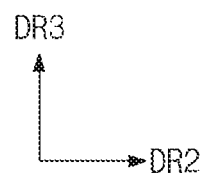

FIG. 12A is a plan view of a partial area of an electronic device, according to one or more exemplary embodiments. FIG. 12B is a cross-sectional view taken along sectional line V-V' of FIG. 12A, according to one or more exemplary embodiments. FIG. 12C is a cross-sectional view taken along sectional line VI-VI' of FIG. 12A, according to one or more exemplary embodiments. For descriptive and illustrative convenience, it is noted that FIG. 12A illustrates an area corresponding to area AA of FIG. 10A. Some of the components and/or features of FIGS. 12A to 12C may be similar to those previously described in association with FIGS. 1 to 11C. As such, duplicative descriptions will be omitted to avoid obscuring exemplary embodiments.

According to one or more exemplary embodiments, the electronic device in FIGS. 12A to 12C includes an interlayer insulating layer ILD-2 including an opening ILD-OP2 having a shape different from that of the opening ILD-OP (refer to FIG. 10A) and the opening ILD-OP1 (refer to FIG. 11A) of the electronic devices in FIGS. 10A to 10C and FIGS. 11A to 11C.

As illustrated in FIG. 12A, the opening ILD-OP2 of the interlayer insulating layer ILD-2 may be selectively defined in an area in which the second driving line TW2-2 overlaps the dam member DM. In a plan view, the opening ILD-OP2 may have a length greater than a width of the dam member DM in the second direction DR2 and a width less than a width of the second driving line TW2-2 in the first direction DR1.

Referring to FIG. 12B, a plurality of second driving lines TW2-2 are disposed on the dam member DM and spaced apart from each other in the first direction DR1. Recessed parts TW2B-R2 are defined in the second lines TW2B-2 and connected to first assistant lines TW2A-2 through the openings ILD-OP2 respectively overlapping the second lines TW2B-2. The layer structure in FIG. 12B may correspond to that in FIG. 11B.

Adverting to FIG. 12C, in a cross-sectional view defined in association with the second direction DR2 and the third direction DR3, the opening ILD-OP2 is defined to overlap the dam member DM, and the first assistant line TW2A-2 and the second line TW2B-2 extend in the second direction DR2. The second line TW2B-2 may partially overlap the interlayer insulating layer ILD-2 and the dam member DM in the second direction DR2, and may be recessed along the opening ILD-OP2 to define a recessed part TW2B-R2 of a determined size and shape. The layer structure in FIG. 12C may correspond to that in FIG. 10C.

Figure 13A:
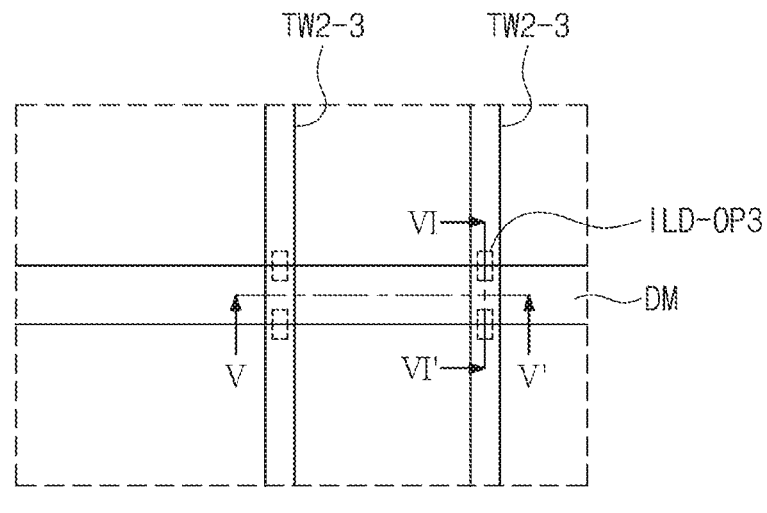
FIG. 13A is a plan view of a partial area of an electronic device, according to one or more exemplary embodiments.
Figure 13A:
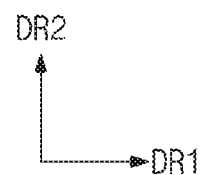
Figure 13B:
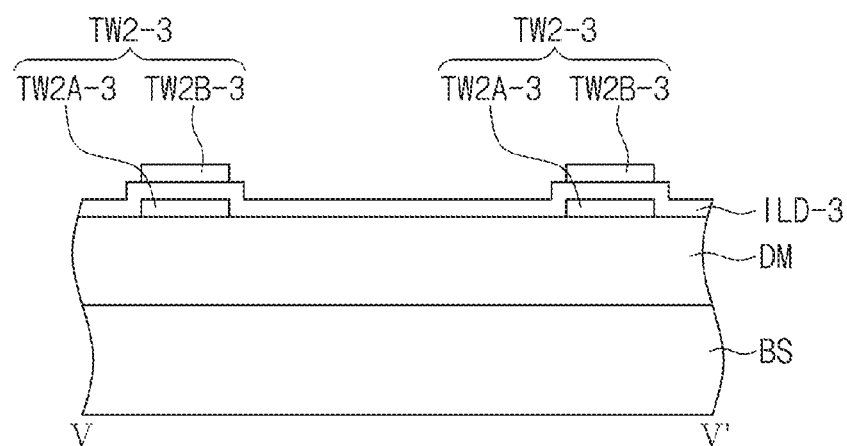
FIG. 13B is a cross-sectional view taken along sectional line V-V' of FIG. 13A, according to one or more exemplary embodiments.
Figure 13B:
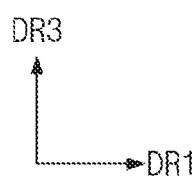
Figure 13C:
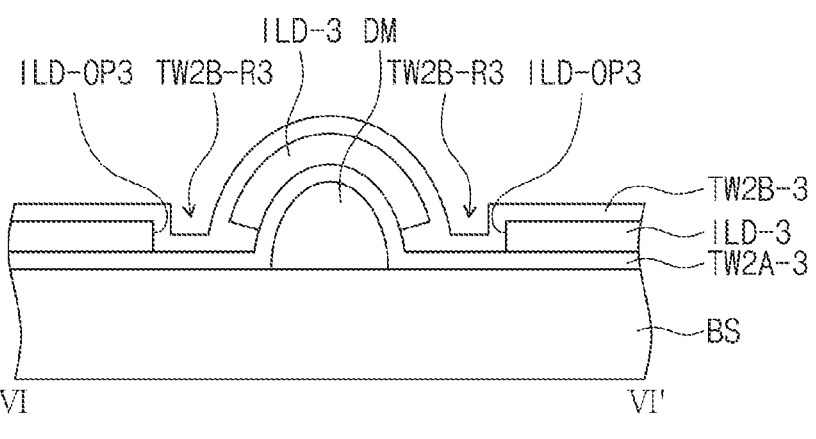
FIG. 13C is a cross-sectional view taken along sectional line VI-VI' of FIG. 13A, according to one or more exemplary embodiments.
Figure 13C:
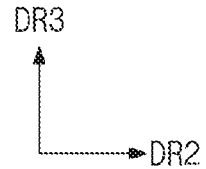

FIG. 13A is a plan view of a partial area of an electronic device, according to one or more exemplary embodiments. FIG. 13B is a cross-sectional view taken along sectional line V-V' of FIG. 13A, according to one or more exemplary embodiments. FIG. 13C is a cross-sectional view taken along sectional line VI-VI' of FIG. 13A, according to one or more exemplary embodiments. For descriptive and illustrative convenience, it is noted that FIG. 13A illustrates an area corresponding to area AA of FIG. 10A. Some of the components and/or features of FIGS. 13A to 13C may be similar to those previously described in association with FIGS. 1 to 12C. As such, duplicative descriptions will be omitted to avoid obscuring exemplary embodiments.

According to one or more exemplary embodiments, the electronic device in FIGS. 13A to 13C includes an interlayer insulating layer ILD-3 including an opening ILD-OP3 having a shape different from that of the opening ILD-OP (refer to FIG. 10A), the opening ILD-OP1 (refer to FIG. 11A), and the opening ILD-OP2 (refer to FIG. 12A) of the electronic devices in FIGS. 10A to 10C, FIGS. 11A to 11C, and FIGS. 12A to 12C.

As illustrated in FIG. 13A, a plurality of openings ILD-OP3 may be defined in the interlayer insulating layer ILD-3 with respect to the second driving line TW2-3. The openings ILD-OP3 partially and respectively overlap an area in which the second driving line TW2-3 overlaps the dam member DM.

Adverting to FIG. 13B, a first assistant line TW2A-3 and a second line TW2B-3 may be spaced apart from each other with the interlayer insulating layer ILD-3 disposed therebetween in an area of the second driving line TW2-3 that overlaps the dam member DM and does not overlap the openings ILD-OP3. As such, the first assistant line TW2A-3 and the second line TW2B-3 may not partially contact each other, but may overlap with the dam member DM.

Referring to FIG. 13C, given that the plurality of openings ILD-OP3 are defined in the interlayer insulating layer ILD-3 in the second direction DR2, the second line TW2B-3 may include a plurality of recessed parts TW2B-R3 spaced apart from each other in the second direction DR2. The plurality of recessed parts TW2B-R3 may be defined in a boundary area of the dam member DM. The boundary area of the dam member DM may be an area in which a degree of protrusion rapidly increases from a flat surface. The electronic device, according to one or more exemplary embodiments, may selectively provide the recessed part TW2B-R3 on the area in which the degree of protrusion is relatively great to effectively decrease the degree of protrusion of the second line TW2B-3. In this manner, the electronic device may include the second driving line TW2-3 that is stably provided even on a protruding surface.

Figure 14A:
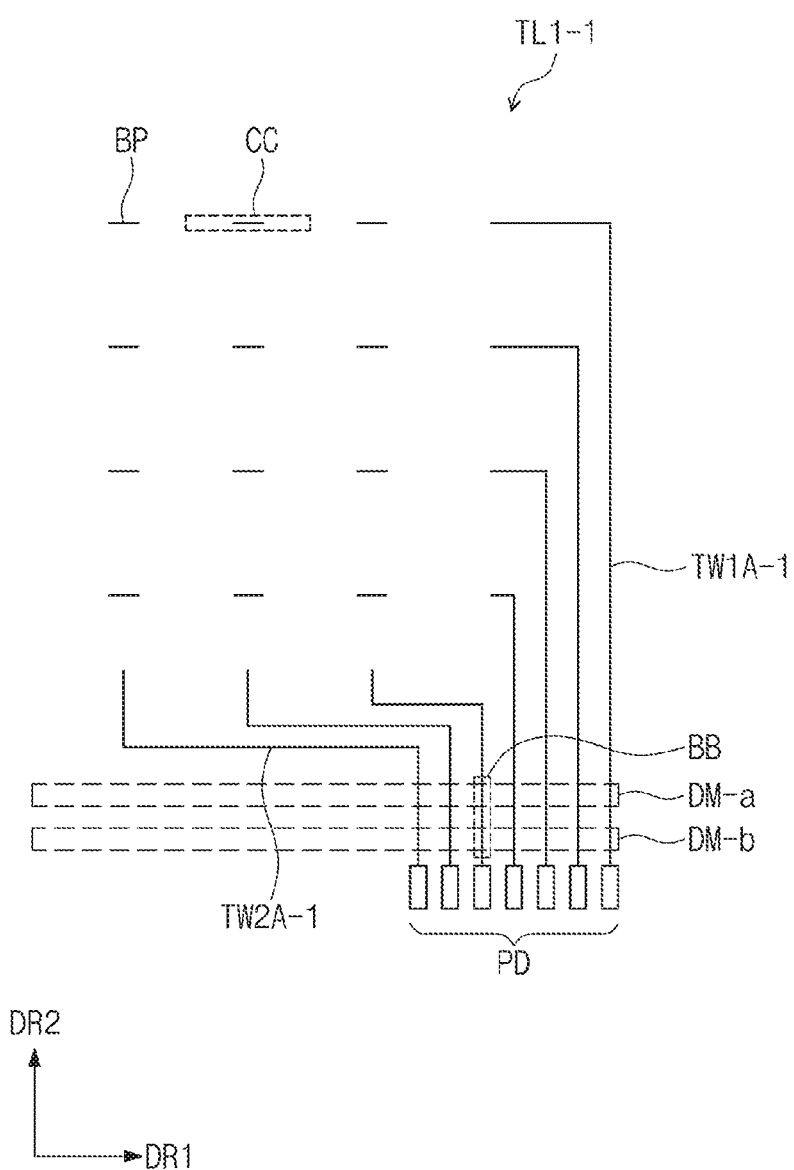
FIGS. 14A, 14B, and 14C are plan views of various layers of a touch array, according to one or more exemplary embodiments.
Figure 14B:
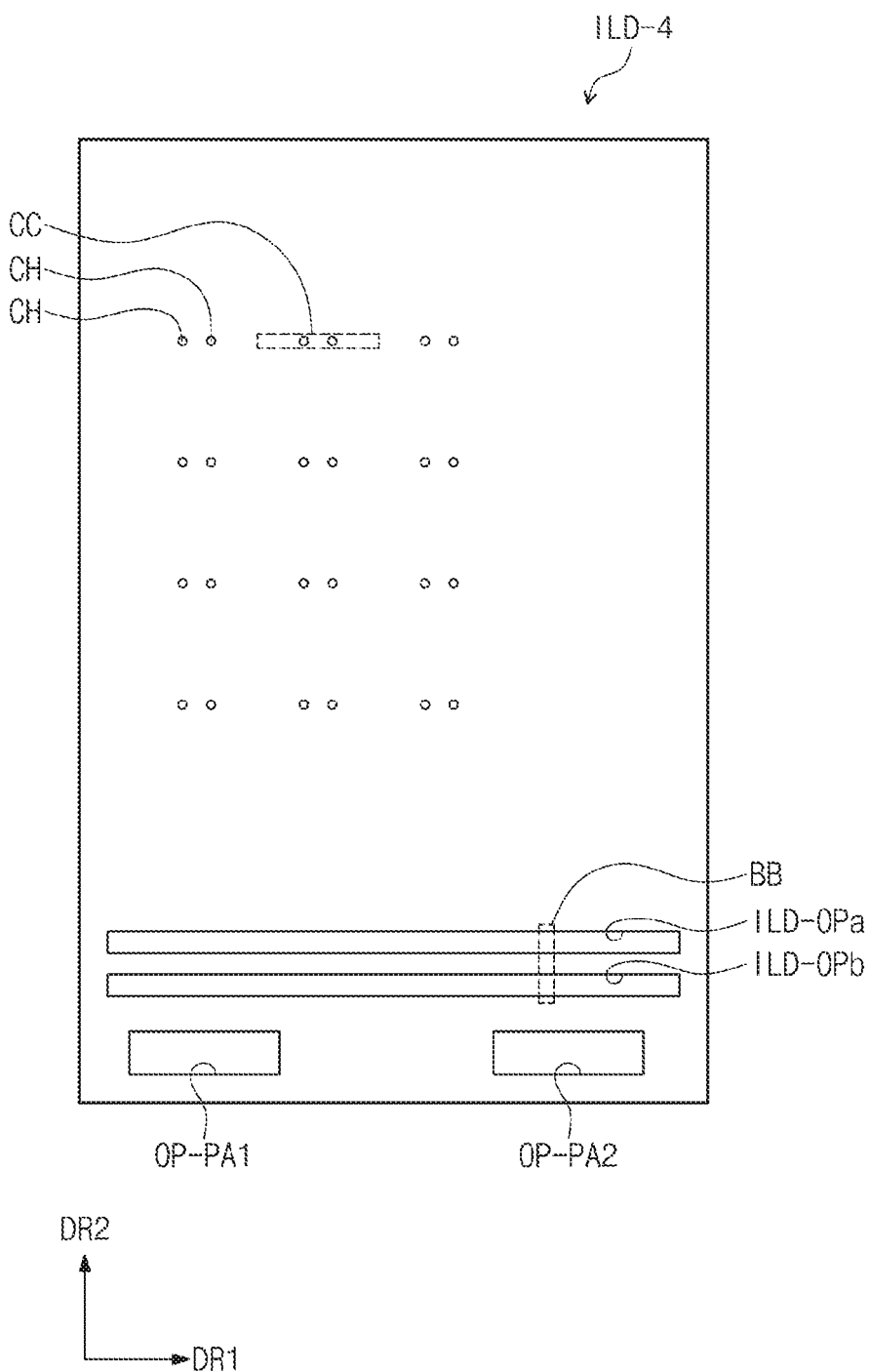
Figure 14C:
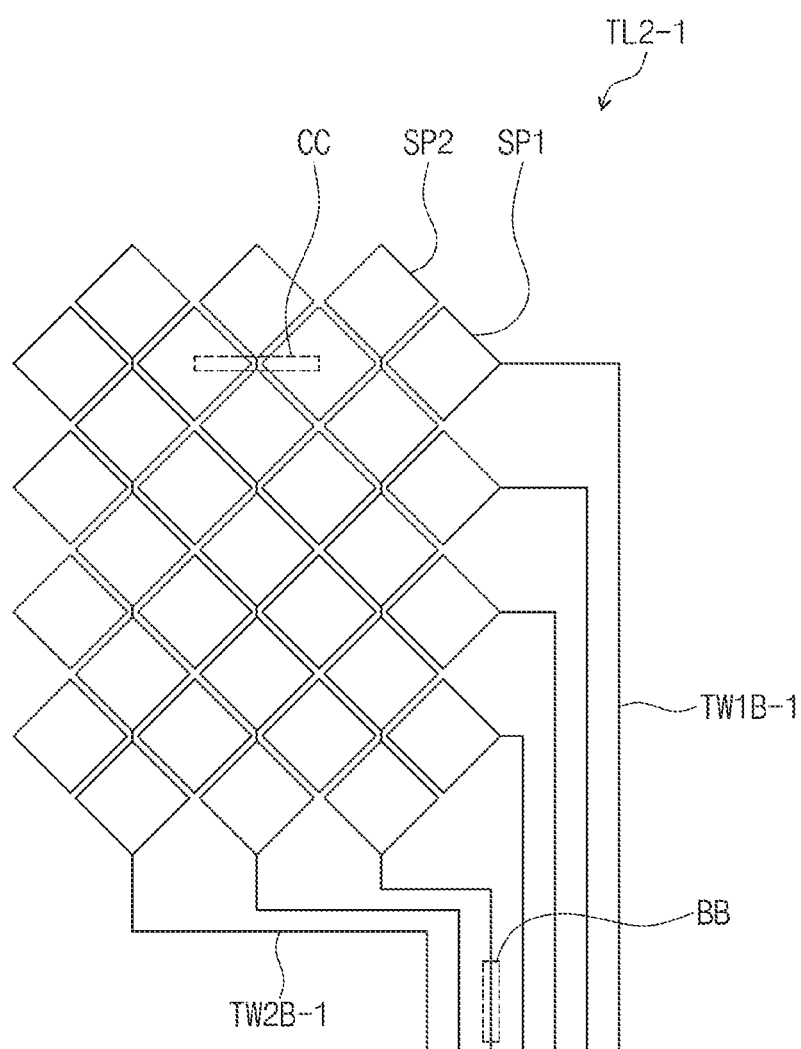
Figure 15A:
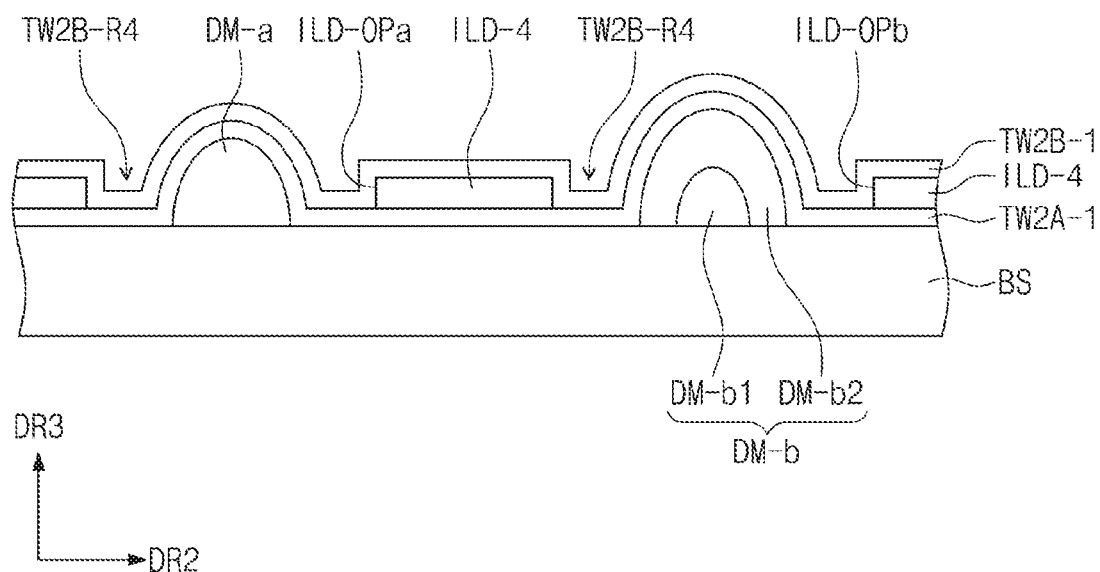
FIG. 15A is a cross-sectional view of an area BB in FIGS. 14A to 14C, according to one or more exemplary embodiments.
Figure 15B:
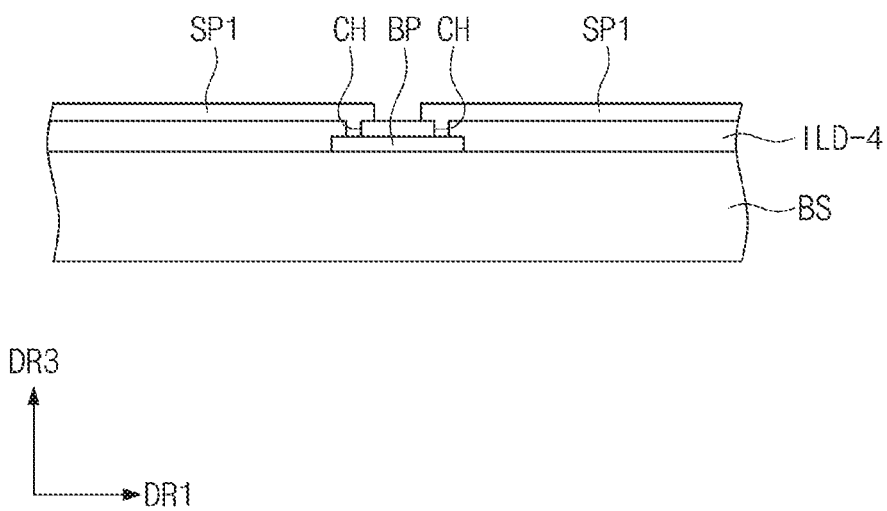
FIG. 15B is a cross-sectional view of an area CC in FIGS. 14A to 14C, according to one or more exemplary embodiments.

FIGS. 14A, 14B, and 14C are plan views of various layers of a touch array, according to one or more exemplary embodiments. FIG. 15A is a cross-sectional view of an area BB in FIGS. 14A to 14C, according to one or more exemplary embodiments. FIG. 15B is a cross-sectional view of an area CC in FIGS. 14A to 14C, according to one or more exemplary embodiments. It is noted that some components and/or features may be similar to those previously described in association with FIGS. 1 to 13C. As such, duplicative descriptions will be omitted to avoid obscuring exemplary embodiments.

As described in association with FIGS. 9A to 9C, FIGS. 14A to 14C respectively illustrate a first detection layer TL1-1, an interlayer insulating layer ILD-4, and a second detection layer TL2-1 that, together, form various layers of a touch array. FIG. 15A is illustrated with reference to a cross-sectional view defined in association with the second direction DR2 and the third direction DR3, and FIG. 15B is illustrated with reference to a cross-section view defined in association with the first direction DR1 and the third direction DR3.

Referring to FIG. 14A, the first detection layer TL1-1 may include a plurality of bridge patterns BP, a plurality of first lines TW1A-1, a plurality of first assistant lines TW2A-1, and a plurality of touch pads PD. Each of the bridge patterns BP may have a shape extending in the first direction DR1. The bridge patterns BP may be arranged and spaced apart from each other in the first direction DR1 and the second direction DR2. The bridge patterns BP may be disposed between first sensing patterns SP1 that will be described later in association with FIG. 14C. In this manner, the bridge patterns BP may have ends disposed, respectively overlapping two adjacent first sensing patterns SP1.

In one or more exemplary embodiments, the first lines TW1A-1 and the first assistant lines TW2A-1 may be arranged and spaced apart from each other. The first lines TW1A-1 and the first assistant lines TW2A-1 may be disposed on a peripheral area. The first lines TW1A-1 and the first assistant lines TW2A-1 may correspond to the first lines TW1A and the first assistant lines TW2A in FIG. 9A, respectively.

The electronic device, according to one or more exemplary embodiments, may include a first dam member (or part) DM-a and a second dam member (or part) DM-b. In this manner, each of the first lines TW1A-1 and the first assistant lines TW2A-1 may partially overlap each of the first and second dam members DM-a and DM-b. According to one or more exemplary embodiments, each of the first and second dam members DM-a and DM-b disposed below the first detection layer TL1-1 is expressed by a dotted line. The touch pads PD may be connected to the first lines TW1A-1 and the first assistant lines TW2A-1, respectively. The touch pads PD may correspond to the touch pads PD in FIG. 9A, respectively.

As illustrated in FIG. 14B, an interlayer insulating layer ILD-4 is disposed on the first detection layer TL1-1. A first opening ILD-OPa, a second opening ILD-OPb, a first pad opening OP-PA1, a second pad opening OP-PA2, and a plurality of contact-holes CH may be defined in the interlayer insulating layer ILD-4. Referring to FIGS. 14B, 15A, and 15B, the first opening ILD-OPa, the second opening ILD-OPb, the first pad opening OP-PA1, the second pad opening OP-PA2, and the plurality of contact-holes CH may respectively expose portions of the first detection layer TL1-1.

The first opening ILD-OPa and the second opening ILD-OPb may expose portions corresponding to the first dam member DM-a and the second dam member DM-b of the first detection layer TL1-1. That is, the first opening ILD-OPa and the second opening ILD-OPb overlap the first dam member DM-a and the second dam member DM-b in a plan view, respectively. According to one or more exemplary embodiments, the first opening ILD-OPa and the second opening ILD-OPb may overlap entire surfaces of the first dam member DM-a and the second dam member DM-b. The first pad opening OP-PA1 and the second pad opening OP-PA2 may expose portions corresponding to the first pad area PA1 and the second pad area PA2 of the first detection layer TL1-1, respectively. The first pad opening OP-PA1 and the second pad opening OP-PA2 may correspond to the first pad opening OP-PA1 and the second pad opening OP-PA2 in FIG. 9B, respectively. Further, the plurality of contact holes CH may be arranged and spaced apart from each other in a touch detectable area, e.g., an active area. The plurality of contact holes CH are defined to correspond to the bridge patterns BP. In one or more exemplary embodiments, each of the plurality of contact holes CH may be defined to overlap each of the ends of the bridge patterns BP.

As illustrated in FIG. 14C, the second detection layer TL2-1 is disposed on the interlayer insulating layer ILD-4. The second detection layer TL2 includes a plurality of first sensing patterns SP1, a plurality of second sensing patterns SP2, a plurality of second lines TW2B-1, and a plurality of second assistant lines TW1B-1. The first sensing patterns SP1 are arranged and spaced apart from each other in the first direction DR1 and the second direction DR2. The first sensing patterns SP1 are disposed and electrically insulated from adjacent second sensing patterns SP2 of the second detection layer TL2-1.

As illustrated in FIG. 15B, the first sensing patterns SP1 are disposed to partially overlap corresponding bridge patterns BP and corresponding contact holes CH. Each of the first sensing patterns SP1 may be connected to the corresponding bridge pattern of the bridge patterns BP through the corresponding contact hole of the contact holes CH and electrically connected to another first sensing pattern SP1 adjacent thereto. Accordingly, although the first sensing patterns SP1 are arranged to be spaced apart from each other, the first sensing patterns SP1 may be electrically connected to each other through the bridge patterns BP disposed on a different layer, e.g., the first detection layer TL1-1.

Adverting back to FIG. 14C, the second sensing patterns SP2 are arranged and spaced apart from the first sensing patterns SP1. The second sensing patterns SP2 may be electrically connected to adjacent second sensing patterns SP2 through determined bridges. The second sensing patterns SP2 may be electrically insulated from the first sensing patterns SP1. The second lines TW2B-1 may be respectively connected to the second sensing patterns SP2, which are disposed adjacent to the second lines TW2B-1, among the second sensing patterns SP2. Each of the second lines TW2B-1 may have the same shape as that of the first assistant lines TW2A-1 of the first detection layer TL1-1. In this manner, the second lines TW2B-1 may overlap an entire surface of the first assistant lines TW2A-1 in a plan view. It is noted, however, that exemplary embodiments are not limited to or by the arrangement of the second lines TW2B-1. For example, the second lines TW2B-1 may be disposed to partially overlap the first assistant lines TW2A-1.

According to one or more exemplary embodiments, the second assistant lines TW1B-1 may be respectively connected to the first sensing patterns SP1, which are disposed adjacent to the second assistant lines TW1B-1, among the first sensing patterns SP1. Each of the second assistant lines TW1B-1 may have the same shape as that of the first lines TW1A-1 of the first detection layer TL1-1. Accordingly, the second assistant lines TW1B-1 may overlap an entire surface of the first lines TW1A-1 in a plan view. It is noted, however, that exemplary embodiments are not limited to or by the arrangement of the second assistant lines TW1B-1. For example, the second assistant lines TW1B-1 may be disposed to partially overlap the first lines TW1A-1.

The second lines TW2B-1 and the second assistant lines TW1B-1 may overlap the first dam member DM-a and the second dam member DM-b in a plan view. Also, the second lines TW2B-1 and the second assistant lines TW1B-1 may overlap the first opening ILD-OPa and the second opening ILD-OPb in the plan view. The second lines TW2B-1 may be connected to the first assistant lines TW2A-1 through the first opening ILD-OPa on the first dam member DM-a, respectively. Accordingly, the second sensing patterns SP2 connected to the second lines TW2B-1 may be electrically connected to the touch pads PD. The second assistant lines TW1B-1 may be connected to the first lines TW1A-1 through the second opening ILD-OPb on the second dam member DM-b, respectively. Accordingly, the first sensing patterns SP1 connected to the second assistant lines TW1B-1 may be electrically connected to the touch pads PD.

Referring to FIG. 15A, the first dam member DM-a and the second dam member DM-b may be arranged and spaced apart from each other in the second direction DR2. The first dam member DM-a may correspond to the dam member DM in FIG. 8. The second dam member DM-b may include a first sub-dam member (or part) DM-b1 and a second sub-dam member DM-b2. The first sub-dam member DM-b1 and the second sub-dam member DM-b2 may be laminated (or otherwise stacked) in the third direction DR3.

Each of the first sub-dam member DM-b1 and the second sub-dam member DM-b2 may include the same material or a different material. For example, each of the first sub-dam member DM-b1 and the second sub-dam member DM-b2 may include an organic material. As another example, the first sub-dam member DM-b1 may include an organic material, and the second sub-dam member DM-b2 may include an inorganic material. Further, the first sub-dam member DM-b1 may include an inorganic material, and the second sub-dam member DM-b2 may include an organic material. The second dam member DM-b, according to one or more exemplary embodiments, may include various materials and have a structure in which a plurality of dam members are laminated. In one or more exemplary embodiments, the first dam member DM-a and the second dam member DM-b may have a different height. For example, the second dam member DM-b has a height greater than that of the first dam member DM-a.

Although the electronic device, according to one or more exemplary embodiments includes the plurality of dam members DM-a and DM-b, given that the interlayer insulating layer ILD-4 in which the corresponding openings ILD-OPa and ILD-OPb are defined is provided, recessed parts TW2B-R4 respectively corresponding to the openings ILD-OPa and ILD-OPb may be defined in the second lines TW2B-1. Accordingly, a degree of protrusion of the second lines TW2B-1 may be relieved. In this manner, defects, such as a disconnection defect caused, at least in part, by the protruding of the second line TW2B-1 may be prevented or at least reduced.

Figure 16A:
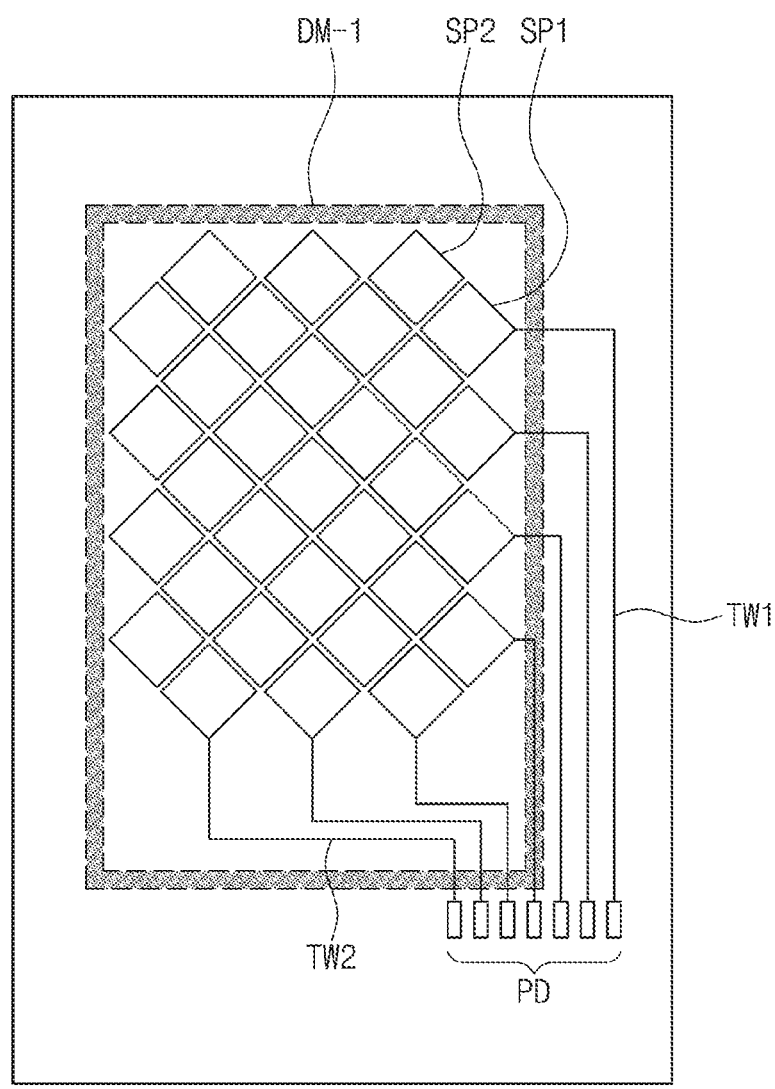
FIGS. 16A and 16B are plan views of a portion of an electronic device, according to one or more exemplary embodiments.
Figure 16B:
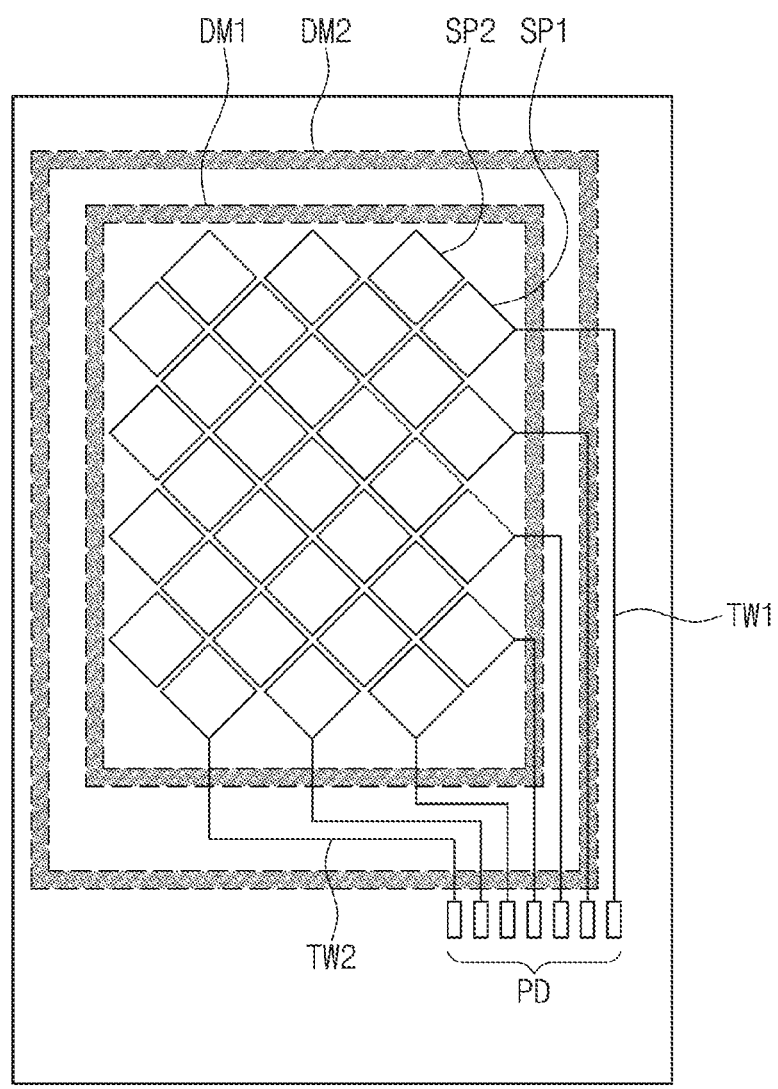

FIGS. 16A and 16B are plan views of a portion of an electronic device, according to one or more exemplary embodiments. Dam members (or parts) DM-1, DM1, and DM2 respectively having various shapes are illustrated in FIGS. 16A and 16B, and the touch array TA is illustrated and described as being assembled. Some components and/or features may be similar to those previously described in association with FIGS. 1 to 15B. As such, duplicative descriptions will be omitted to avoid obscuring exemplary embodiments.

Referring to FIG. 16A, the dam member (or part) DM-1 may have a frame shape. The dam member DM-1 may surround an area on which a first sensing pattern SP1 and a second sensing pattern SP2 are arranged. According to one or more exemplary embodiments, the first sensing pattern SP1 may correspond to the first sensing pattern SP1A (refer to FIG. 9A) in FIG. 9A, and the second sensing pattern SP2 may correspond to the second sensing pattern SP2B (refer to FIG. 9C) in FIG. 9C. It is also contemplated that, as illustrated in FIG. 16B, the electronic device may include a plurality of dam members (or parts) DM1 and DM2. Each of the dam members DM1 and DM2 may have a frame shape. The dam members DM1 and DM2 may include a first dam member DM1 and a second dam member DM2. The first dam member DM1 may surround the first and second sensing patterns SP1 and SP2, and the second dam member DM2 may surround the first dam member DM1.

According to one or more exemplary embodiments, each of a first driving line TW1 and a second driving line TW2 may overlap each of the first dam member DM1 and the second dam member DM2. In this manner, dummy lines (not shown) and lines constituting each of the first driving line TW1 and the second driving line TW2 and disposed on layers different from each other may be connected to each other in each of a plurality of areas.

The electronic device, according to one or more exemplary embodiments, may include the dam members respectively having various shapes. When the protruding pattern PP (refer to FIG. 1) in FIG. 1 corresponds to the dam member, the opening of the interlayer insulating layer may be defined in a shape corresponding to the dam member or defined in a portion of an area that overlaps the dam member of the first driving line TW1 and the second driving line TW2. As previously described, although the interlayer insulating layer may be variously provided in shape, exemplary embodiments are not limited thereto or thereby.

FIGS. 17A, 17B, 17C, 17D, 17E, 17F, and 17G are cross-sectional views of an electronic device at various stages of manufacture, according to one or more exemplary embodiments. For descriptive and illustrative convenience, FIGS. 17A to 17G illustrate an area corresponding to that in FIG. 10C. Hereinafter, an illustrative method for manufacturing an electronic device, according to one or more exemplary embodiments, will be described with reference to FIGS. 17A to 17G. Some components and/or features may be similar to those previously described in association with FIGS. 1 to 16B. As such, duplicative descriptions will be omitted to avoid obscuring exemplary embodiments.

Figure 17A:
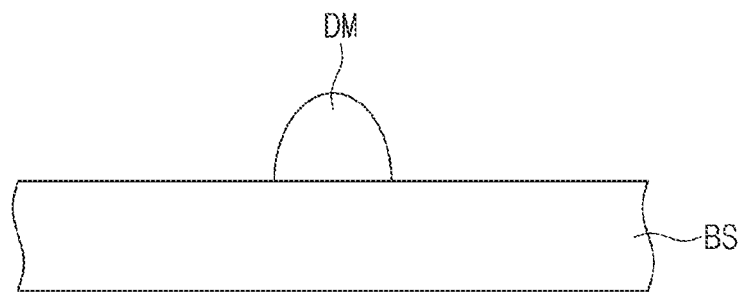
FIGS. 17A, 17B, 17C, 17D, 17E, 17F, and 17G are cross-sectional views of an electronic device at various stages of manufacture, according to one or more exemplary embodiments.
Figure 17A:
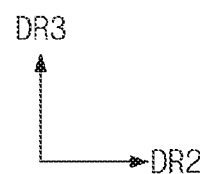

Referring to FIG. 17A, the dam member DM is formed on the base substrate BS. The dam member DM protrudes in the third direction DR3. The dam member DM protrudes from an adjacent upper surface of the base substrate BS to provide a non-flat surface to the upper surface of the base substrate BS. The dam member DM may correspond to the protruding pattern PP in FIGS. 1 and 7B. In one or more exemplary embodiments, the dam member DM may be formed by patterning an insulating material. The dam member DM may be formed from, for instance, an organic material layer applied on the base substrate BS that is then patterned, or formed by laminating a plurality of organic patterns and inorganic patterns.

Figure 17B:
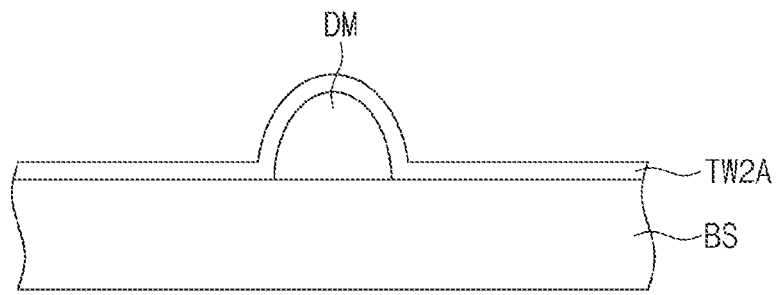
Figure 17B:
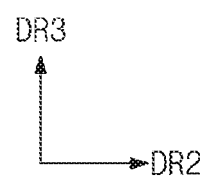

As illustrated in FIG. 17B, the first assistant line TW2A is formed on the base substrate BS. The first assistant line TW2A may correspond to the first conductive pattern CP1 in FIG. 7B. Although not shown, the first assistant line TW2A may be formed such that a conductive material layer covering the base substrate BS and the dam member DM is formed and then patterned. Although the first assistant line TW2A is illustrated with the layer structure in a cross-sectional view defined in association with the second direction DR2 and the third direction DR3, as illustrated in FIG. 10A, the first assistant line TW2A may be a line shaped pattern extending in the second direction DR2. Further, the first assistant line TW2A may be formed to have a relatively low thickness in comparison with that of the dam member DM. Accordingly, an upper surface of the first assistant line TW2A may form a protruding curved surface corresponding to a shape of the dam member DM.

Figure 17C:
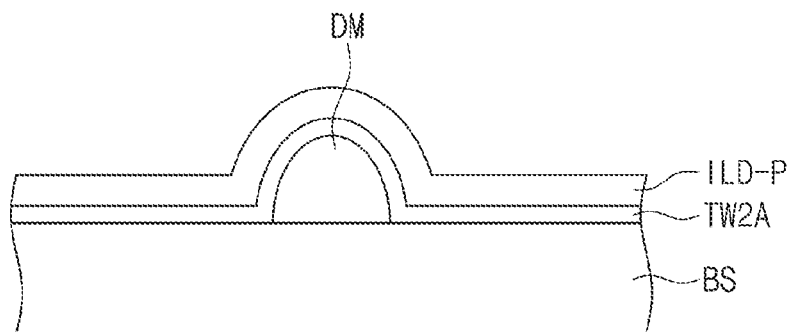
Figure 17C:
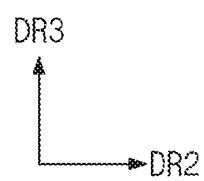
Figure 17D:
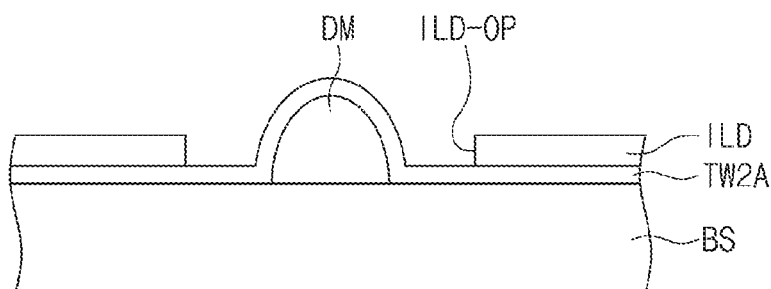
Figure 17D:
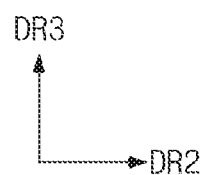

As illustrated in FIGS. 17C and 17D, an initial insulating layer ILD-P is formed on the first assistant line TW2A and is then patterned to form the interlayer insulating layer ILD. The interlayer insulating layer ILD may correspond to the interlayer insulating layer IL40 in FIG. 7B. The initial insulating layer ILD-P may be formed to have a relatively low thickness in comparison with that of the dam member DM. Accordingly, an upper surface of the initial insulating layer ILD-P may form a protruding curved surface corresponding to the shape of the dam member DM. Thereafter, a portion of the initial insulating layer ILD-P, which overlaps the dam member DM, is removed to form the opening ILD-OP of a determined size and shape. The protruding curved surface of the first assistant line TW2A is exposed from the interlayer insulating layer ILD through the opening ILD-OP.

Figure 17E:
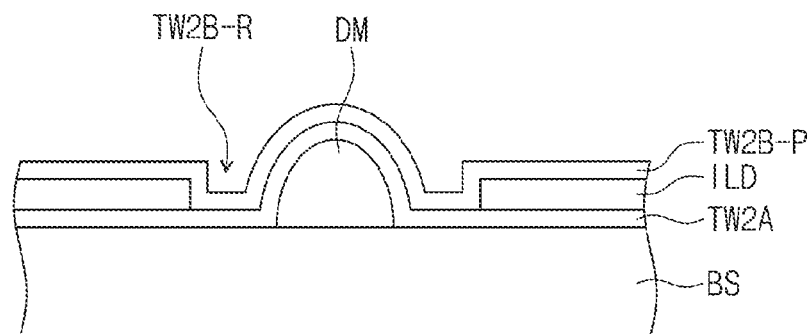
Figure 17E:
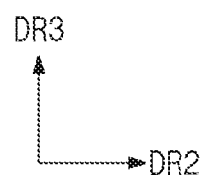

Adverting to FIG. 17E, an initial conductive layer TW2B-P is formed on the interlayer insulating layer ILD. The initial conductive layer TW2B-P may be formed by depositing or coating a conductive material on the interlayer insulating layer ILD. The initial conductive layer TW2B-P may be formed to have a relatively low thickness in comparison with that of the dam member DM. Accordingly, the initial conductive layer TW2B-P may form an upper surface reflecting a shape of a surface on which the initial conductive layer TW2B-P is provided. For example, the initial conductive layer TW2B-P may provide a protruding upper surface corresponding to the shape of the dam member DM. Also, the recessed part TW2B-R recessed along a boundary of the opening ILD-OP and defined in the upper surface of the initial conductive layer TW2B-P may be formed.

Figure 17F:
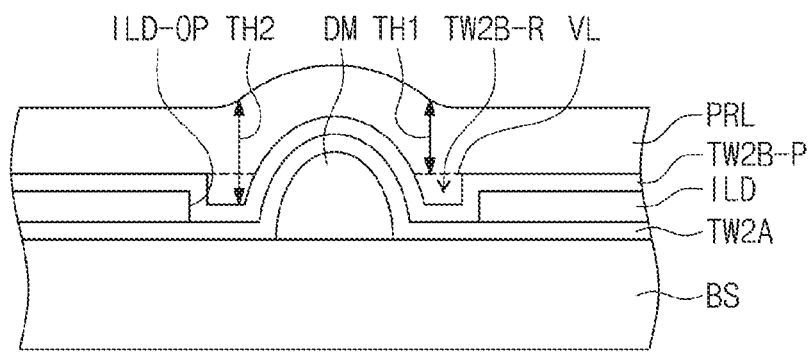
Figure 17F:
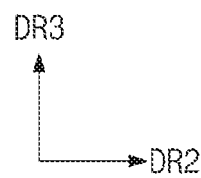
Figure 17G:
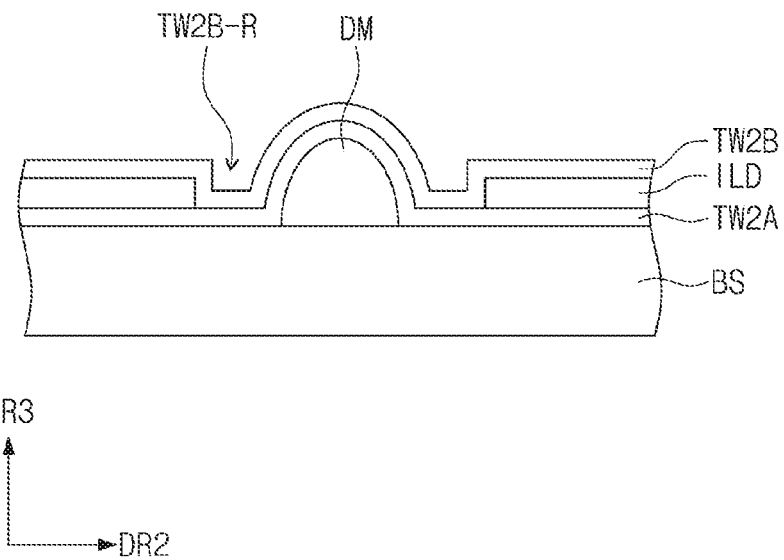

As illustrated in FIGS. 17F and 17G, the initial conductive layer TW2B-P is patterned to from a second line TW2B. The second line TW2B may correspond to the conductive pattern CP in FIG. 1A or the second conductive pattern CP2 in FIG. 7B. As part of forming the second line TW2B, a sensitive film PRL may be formed on the initial conductive layer TW2B-P. The sensitive film PRL covers a portion of the initial conductive layer TW2B-P and exposes a portion of the initial conductive layer TW2B-P. A shape of the sensitive film PRL determines a shape of the second line TW2B. In one or more exemplary embodiments, a portion of the initial conductive layer TWB2-P, which is exposed by the sensitive film PRL, is removed through an etching process to form the second line TW2B. Although the sensitive film PRL and the second line TW2B have the same shape as that of the initial conductive layer TW2B-P in FIGS. 17F and 17G, as illustrated in FIG. 10A, the second line TW2B and the sensitive film PRL may be line shaped patterns extending in the second direction DR2.

According to one or more exemplary embodiments, the sensitive film PRL has a relatively greater thickness in comparison with that of the initial conductive layer TW2B-P. In this manner, a second thickness TH2 of the sensitive film PRL in the recessed part TW2B-R may be greater than a first thickness TH1 of the sensitive film PRL from a virtual surface VL. The virtual surface VL is a virtual surface in which a surface, which is adjacent to the recessed part TW2B-R, of an upper surface of the initial conductive layer TW2B-P extends. The virtual surface VL may correspond to the upper surface of the initial conductive layer TW2B-P when the opening ILD-OP is not defined. As the opening ILD-OP is formed, the electronic device according to one or more exemplary embodiments may form the recessed part TW2B-R on the initial conductive layer TW2B-P to secure a determined thickness of the sensitive film PRL.

The sensitive film PRL serves as a mask protecting a lower component from an etching solution or etching gas in the etching process. Accordingly, as the thickness of the sensitive film PRL decreases, the lower component may be more easily damaged during the etching process, and reliability of the patterning may be reduced. According to one or more exemplary embodiments, the method for manufacturing the electronic device may further include a process of forming the opening ILD-OP in the interlayer insulating layer ILD to secure the thickness of the sensitive film PRL, which is equal to or greater than a determined thickness. In this manner, the sensitive film PRL may protect the second line TW2B during the patterning process, and, as such, a process reliability of the second line TW2B may increase.

According to one or more exemplary embodiments, a method for manufacturing an electronic device may stably form a conductive pattern when the conductive pattern is formed on a non-flat surface even though a separate non-flat film is not formed. According to one or more exemplary embodiments, although the conductive pattern is formed on the protruding surface, defects, such as a disconnection defect of the conductive pattern caused, at least in part, by the protruding shape may be prevented (or at least reduced). In this manner, a process may be simplified, and a process time may be reduced, which also reduces manufacturing costs.

According to one or more exemplary embodiments, a conductive pattern provided on a non-flat surface may have improved reliability. In this manner, an electronic device including the conductive pattern that is stably formed can avoid (or reduce) defects, such as a disconnection defect even though the conductive pattern is formed on the protruding surface. To this end, a process may be simplified and manufacturing costs may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electronic device comprising:
a substrate;
a protruding pattern disposed on the substrate to protrude upward;
a first conductive pattern disposed on the substrate and covering the protruding pattern;
an insulating layer disposed on the first conductive pattern and in which an opening overlapping at least a portion of the protruding pattern is defined; and
a second conductive pattern disposed on the insulating layer and connected to the first conductive pattern through the opening on the protruding pattern,
wherein the protruding pattern is disposed between the first conductive pattern and the substrate,
wherein a thickness of the protruding pattern is greater than a thickness of the insulating layer, and
wherein a contact portion of the first conductive pattern in contact with the second conductive pattern overlaps the protruding pattern in a plan view.

2. The electronic device of claim 1, wherein the first conductive pattern comprises a first portion exposed by the opening and a second portion covered by the insulating layer, and
the first portion protrudes upward from the second portion.

3. The electronic device of claim 2, wherein the second conductive pattern covers an upper surface of the insulating layer and an upper surface of the first portion.

4. The electronic device of claim 2, wherein an upper surface of the second conductive pattern comprises a first surface overlapping the first portion, a second surface overlapping the insulating layer, and a third surface configured to connect the first surface to the second surface, and
the first surface and the third surface are recessed from a portion of the second surface, which is adjacent to the third surface, to define a recessed part.

5. The electronic device of claim 4, wherein the second surface comprises a curved surface protruding upward along the protruding pattern.

6. The electronic device of claim 1, wherein the protruding pattern extends in a first direction, and
the second conductive pattern extends in a second direction crossing the first direction.

7. The electronic device of claim 6, wherein the opening extends along the protruding pattern.

8. The electronic device of claim 7, wherein the opening overlaps an entire surface of the protruding pattern in a plan view.

9. The electronic device of claim 6, wherein the opening extends along the second conductive pattern.

10. The electronic device of claim 6, wherein the first conductive pattern and the second conductive pattern extend in parallel to each other.

11. The electronic device of claim 6, wherein the second conductive pattern comprises a plurality of patterns arranged in the first direction, and
the opening exposes portions, which overlap the protruding pattern, of each of the plurality of patterns.

12. The electronic device of claim 11, wherein the opening comprises a plurality of sub-openings arranged to be spaced apart from each other, and
the plurality of sub-openings respectively expose the portions of each of the plurality of patterns.

13. The electronic device of claim 12, wherein the plurality of sub-openings are arranged along the protruding pattern.

14. The electronic device of claim 12, wherein at least portions of the plurality of sub-openings are arranged along one pattern of the plurality of patterns to partially expose the one pattern.

15. The electronic device of claim 1, further comprising a pixel array comprising a plurality of signal lines disposed on the substrate and a plurality of pixels configured to respectively receive electrical signals through the signal lines; and
a touch array disposed on one side of the pixel array to detect touch provided from the outside,
wherein at least one of the pixel array and the touch array comprises the first conductive pattern and the second conductive pattern.

16. The electronic device of claim 15, further comprising an encapsulation layer disposed between the pixel array and the touch array,
wherein the protruding pattern is disposed adjacent to the encapsulation layer in a plan view.

17. The electronic device of claim 16, wherein the protruding pattern surrounds the encapsulation layer in a plan view.

18. The electronic device of claim 16, wherein the touch array comprises:
a sensor disposed on the encapsulation layer to receive an external touch signal;
first lines connected to the sensor, disposed below the insulating layer, and of which at least a portion is provided as the first conductive pattern; and
second lines connected to the sensor, disposed on the insulating layer, and of which at least a portion is provided as the second conductive pattern, and
at least a portion of the first lines and at least a portion of the second lines are connected to each other through the opening on the protruding pattern.

19. The electronic device of claim 1, wherein the protruding pattern comprises an insulating material.

20. The electronic device of claim 19, wherein the protruding pattern comprises an organic material.

21. An electronic device comprising:
a substrate;
an insulating pattern disposed on the substrate to protrude upward further than an area adjacent thereto;
a conductive pattern disposed on the substrate to cover the insulating pattern, and the conductive pattern overlaps the insulating pattern and an area adjacent to the insulating pattern in a plan view;

an insulating layer disposed between the conductive pattern and the insulating pattern and in which an opening overlapping at least a portion of the insulating pattern is defined, wherein the insulating pattern is disposed between the conductive pattern and the substrate, wherein the conductive pattern comprises a recessed part defined along the opening, and wherein a protrude height of the insulating pattern is greater than a maximum thickness of the insulating layer.

22. The electronic device of claim 21, wherein a upper surface of the conductive pattern comprises a first surface overlapping the insulating pattern, a second surface overlapping the insulating layer, and a third surface configured to connect the first surface to the second surface, and the first surface and the third surface are recessed from a portion of the second surface, which is adjacent to third surface, to define the recessed part.

23. The electronic device of claim 22, wherein the second surface comprises a curved surface convex to upward.

24. The electronic device of claim 21, wherein the opening exposes an entire surface of the insulating pattern.

25. The electronic device of claim 21, wherein the insulating layer overlaps only the insulating pattern in a plan view.

* * * * *